Dec. 12, 1950   G. W. BRADY ET AL   2,533,346
DUAL ROTATION PROPELLER
Filed Jan. 19, 1944   12 Sheets-Sheet 1
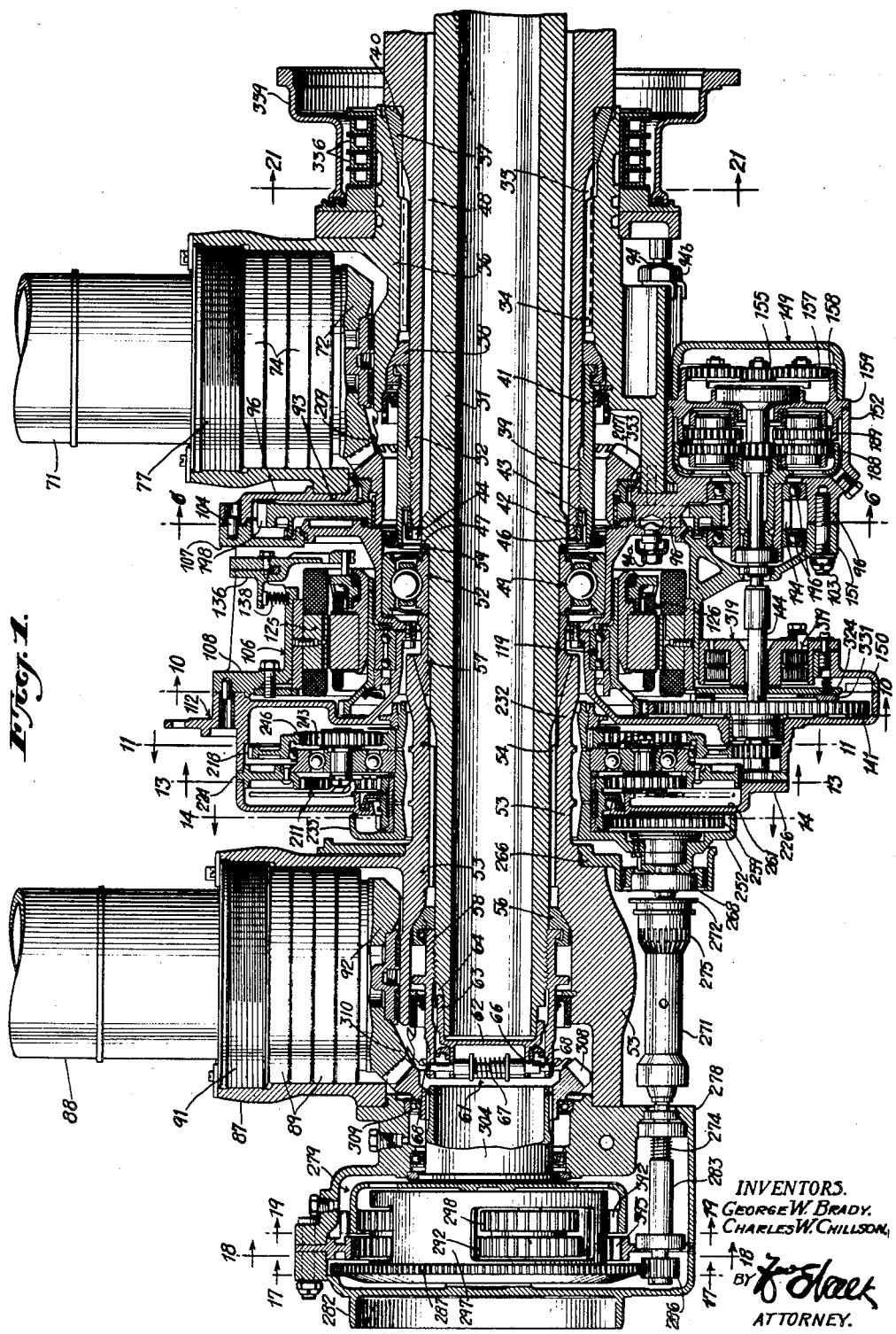
INVENTORS.
*George W. Brady.*
*Charles W. Chillson.*
BY *F. Slack*
ATTORNEY.

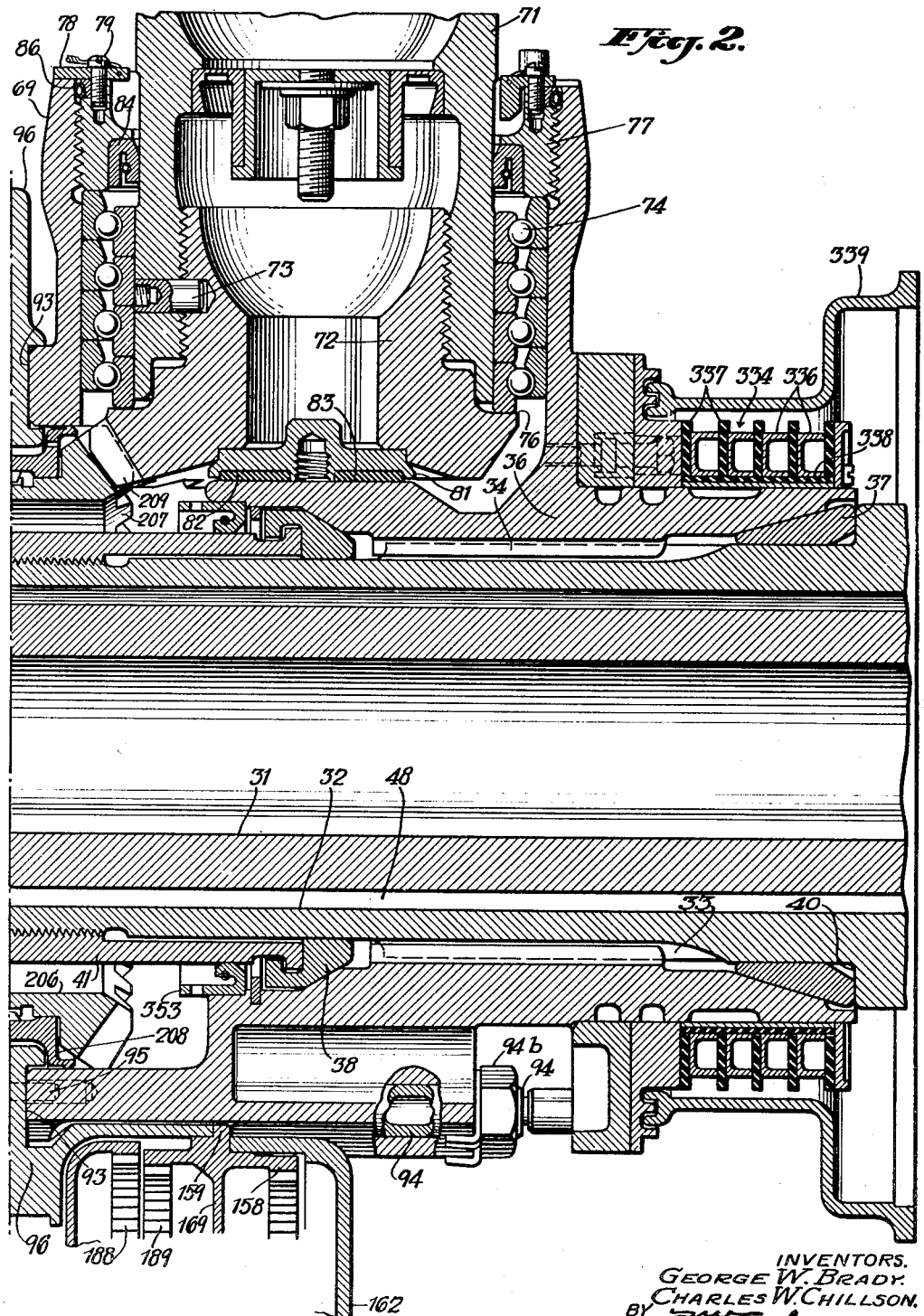

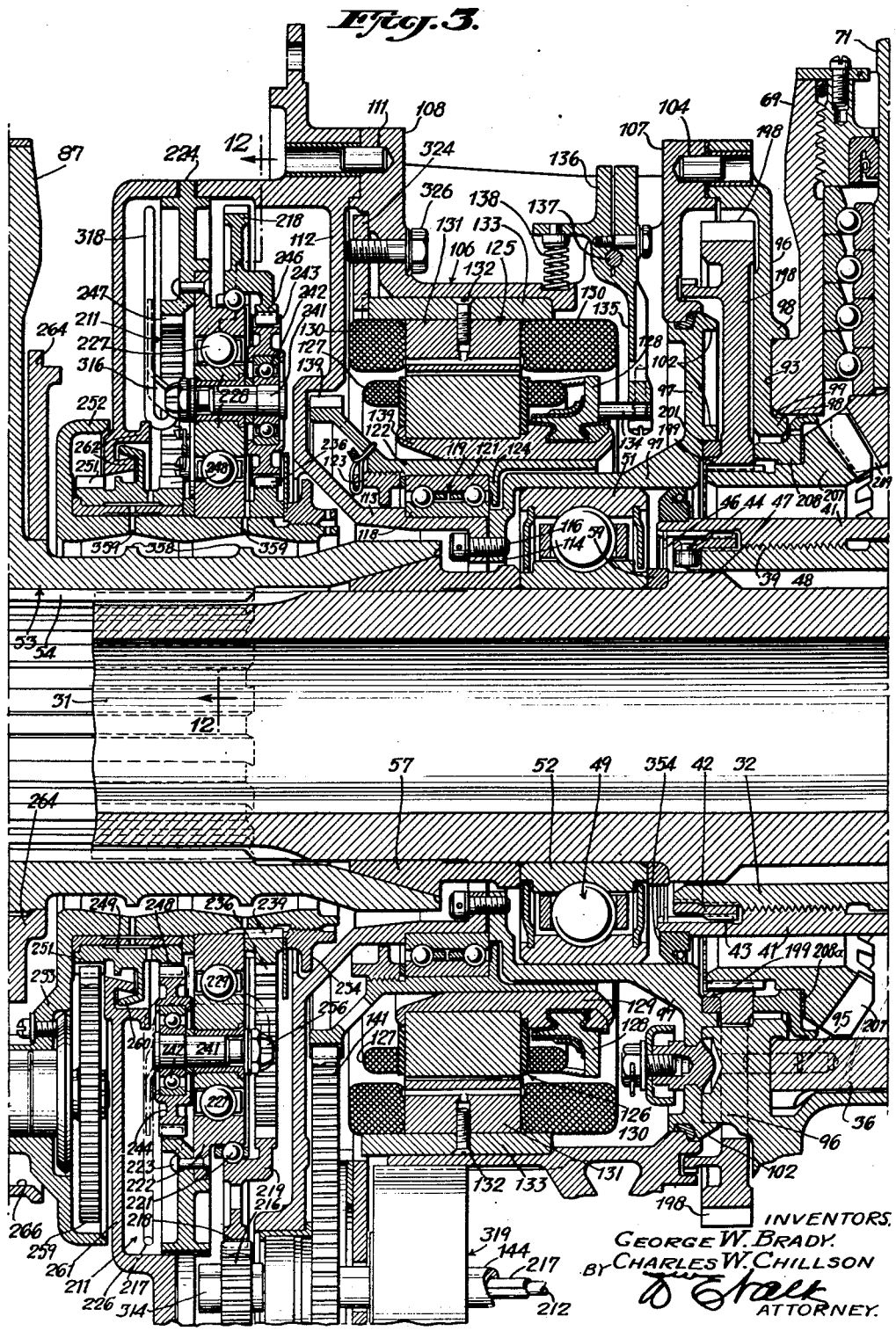

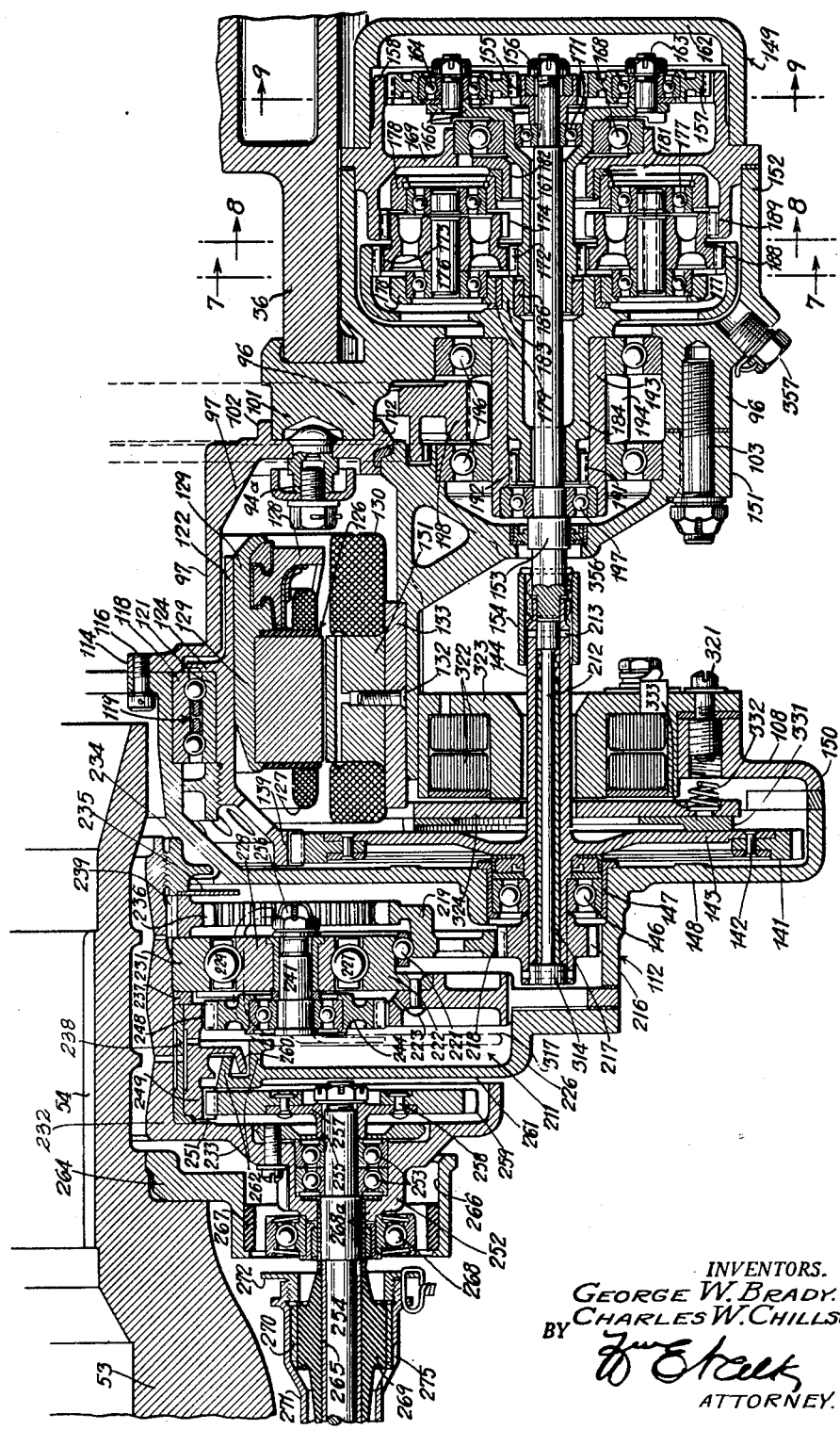

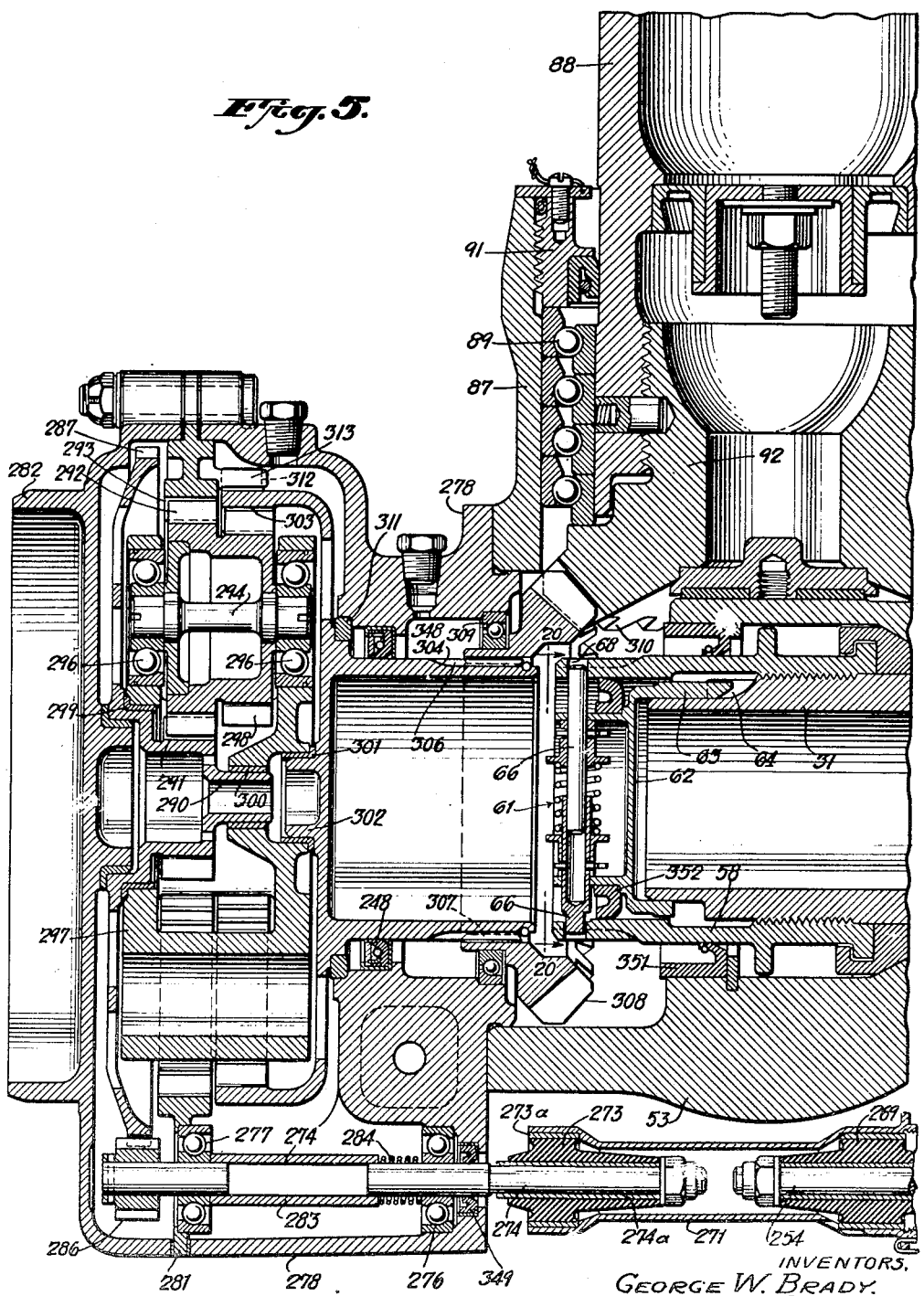

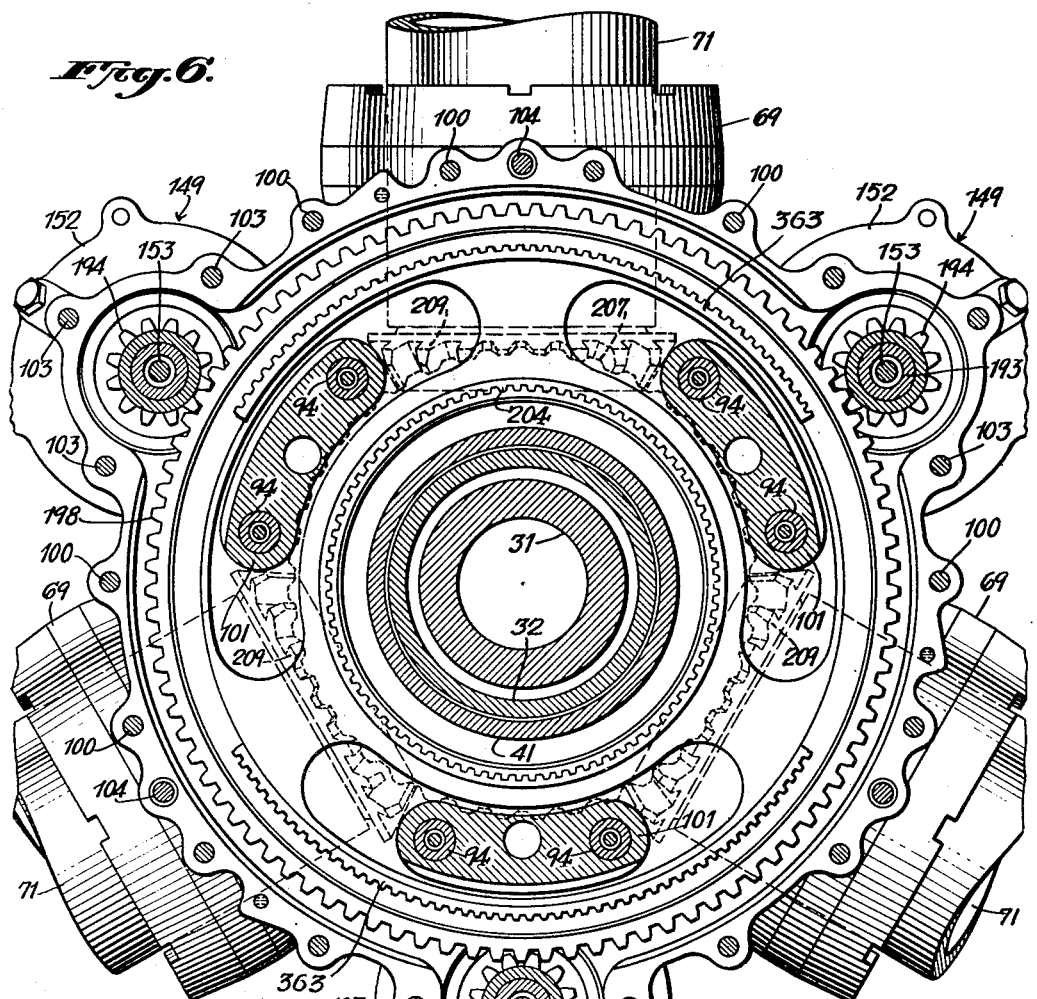
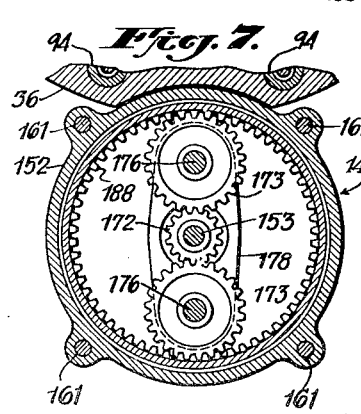
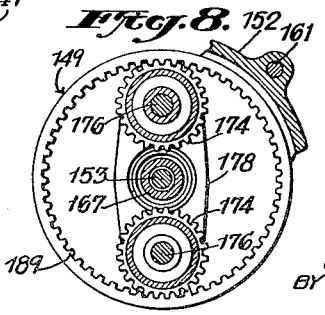
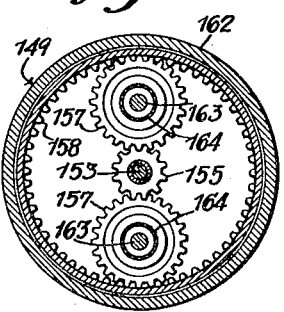

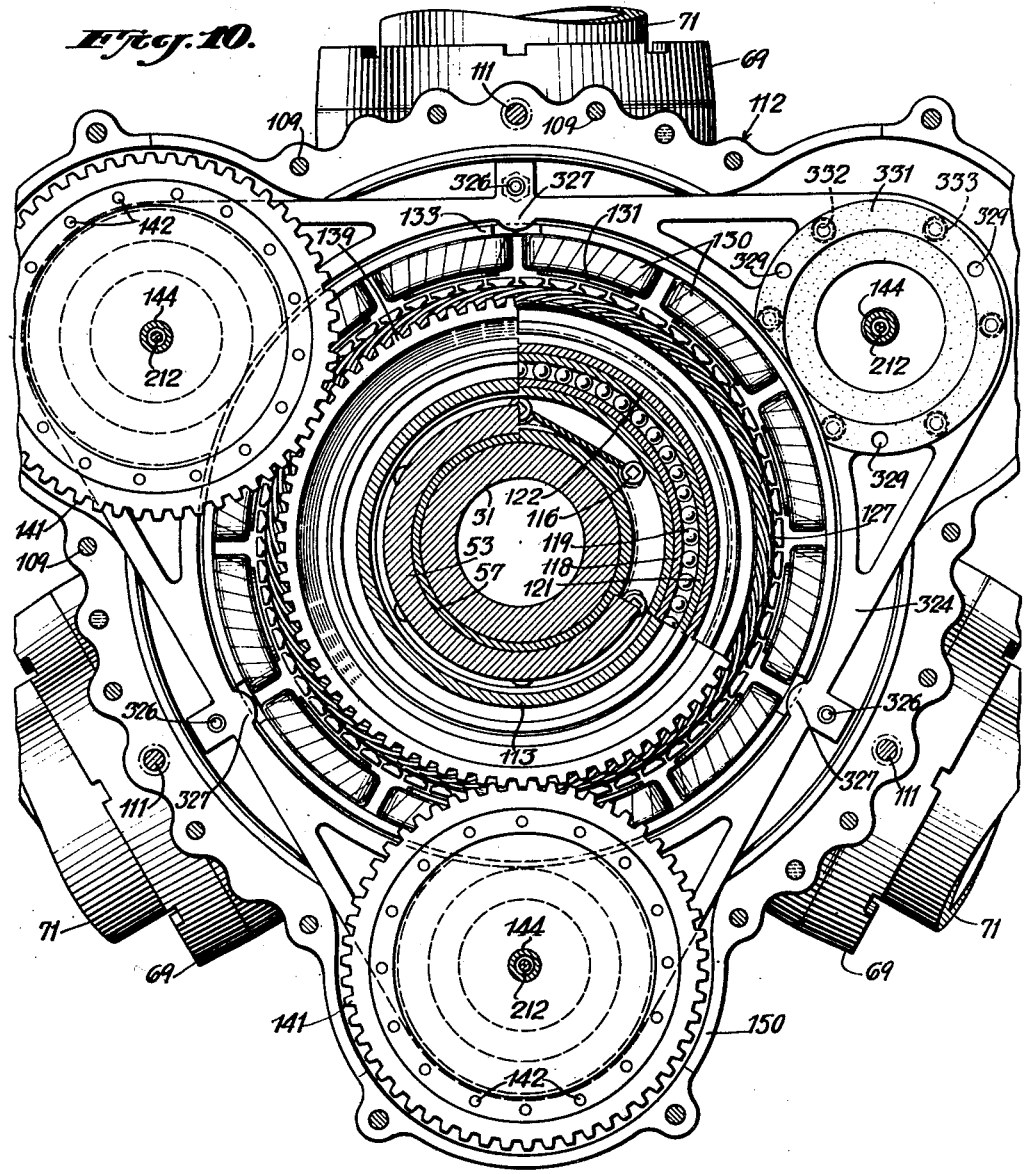

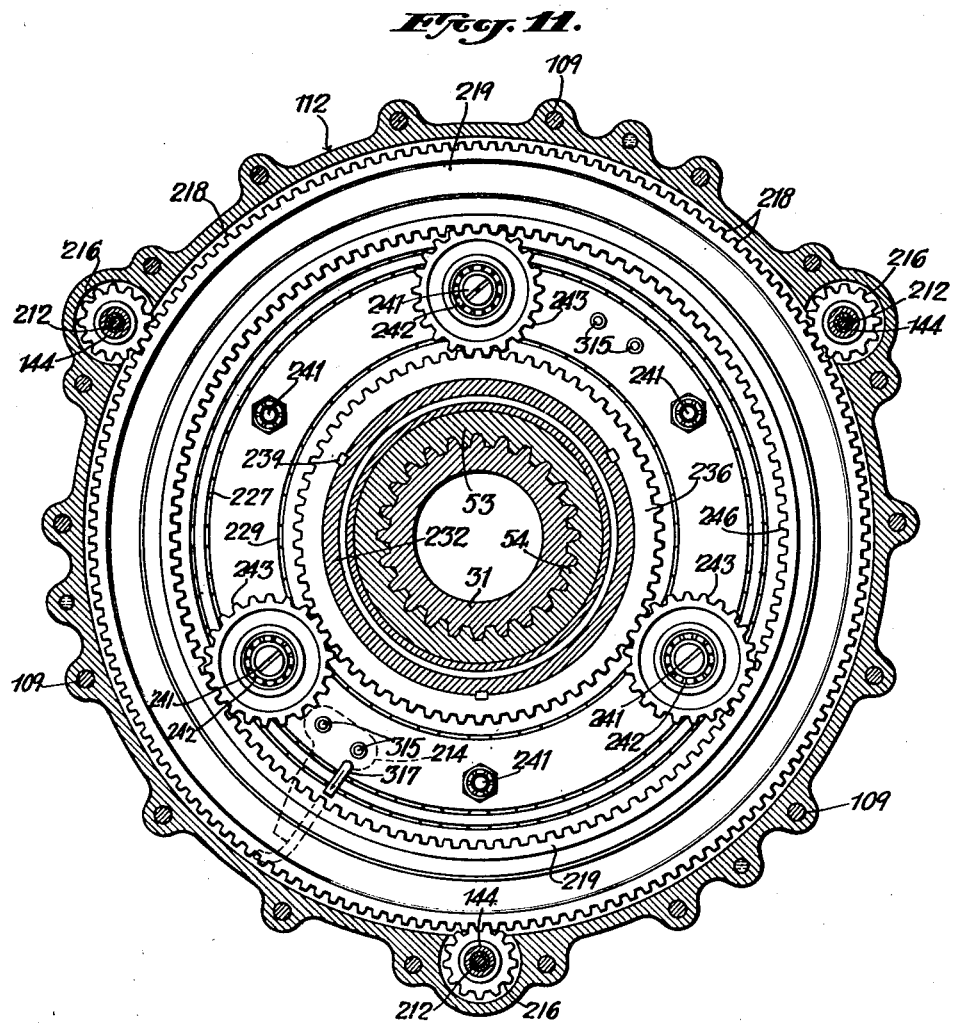
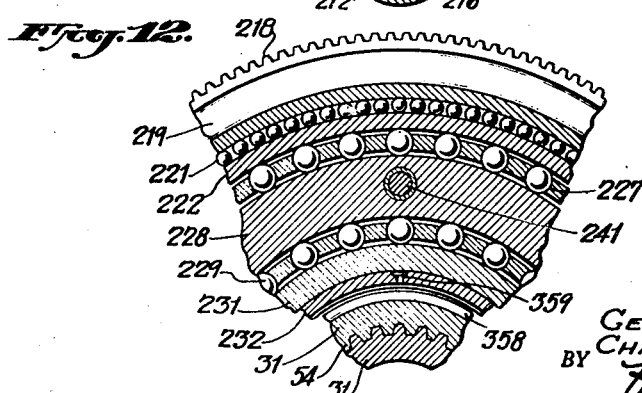

Dec. 12, 1950     G. W. BRADY ET AL     2,533,346
DUAL ROTATION PROPELLER
Filed Jan. 19, 1944     12 Sheets-Sheet 9
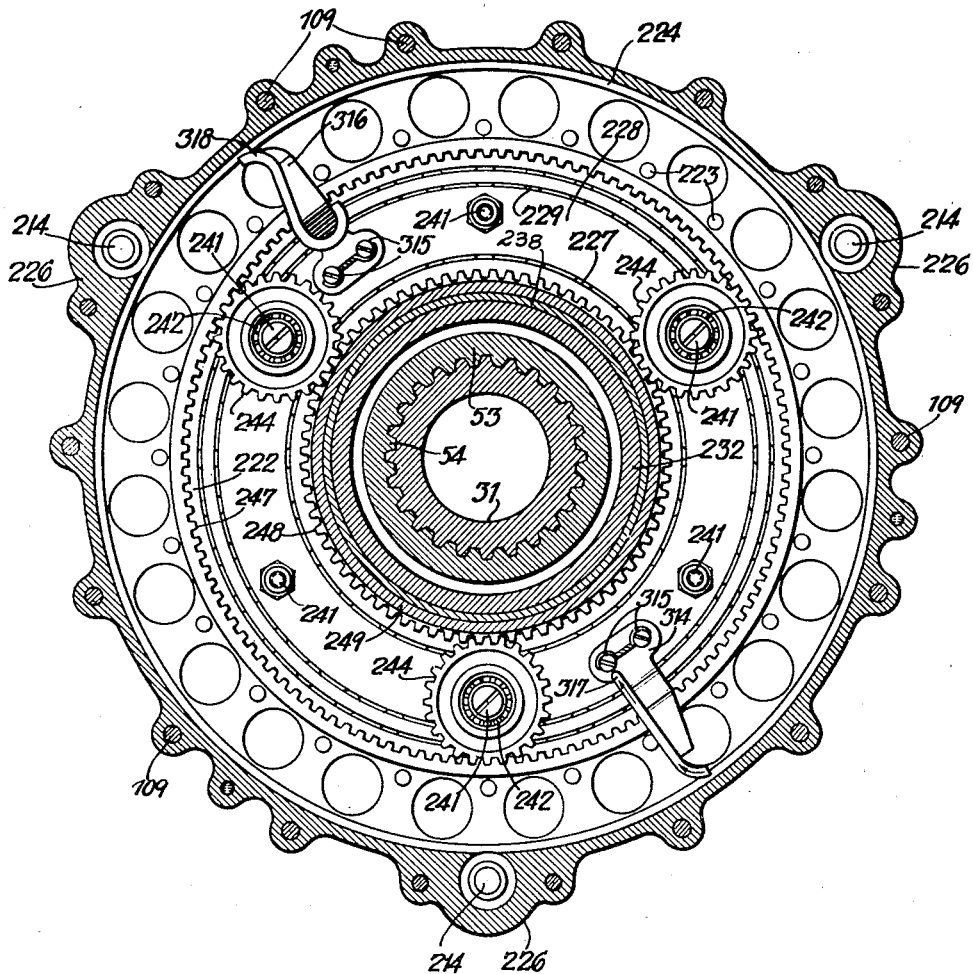
INVENTORS.
GEORGE W. BRADY.
BY CHARLES W. CHILLSON.
ATTORNEY.

Dec. 12, 1950    G. W. BRADY ET AL    2,533,346
DUAL ROTATION PROPELLER
Filed Jan. 19, 1944    12 Sheets-Sheet 10
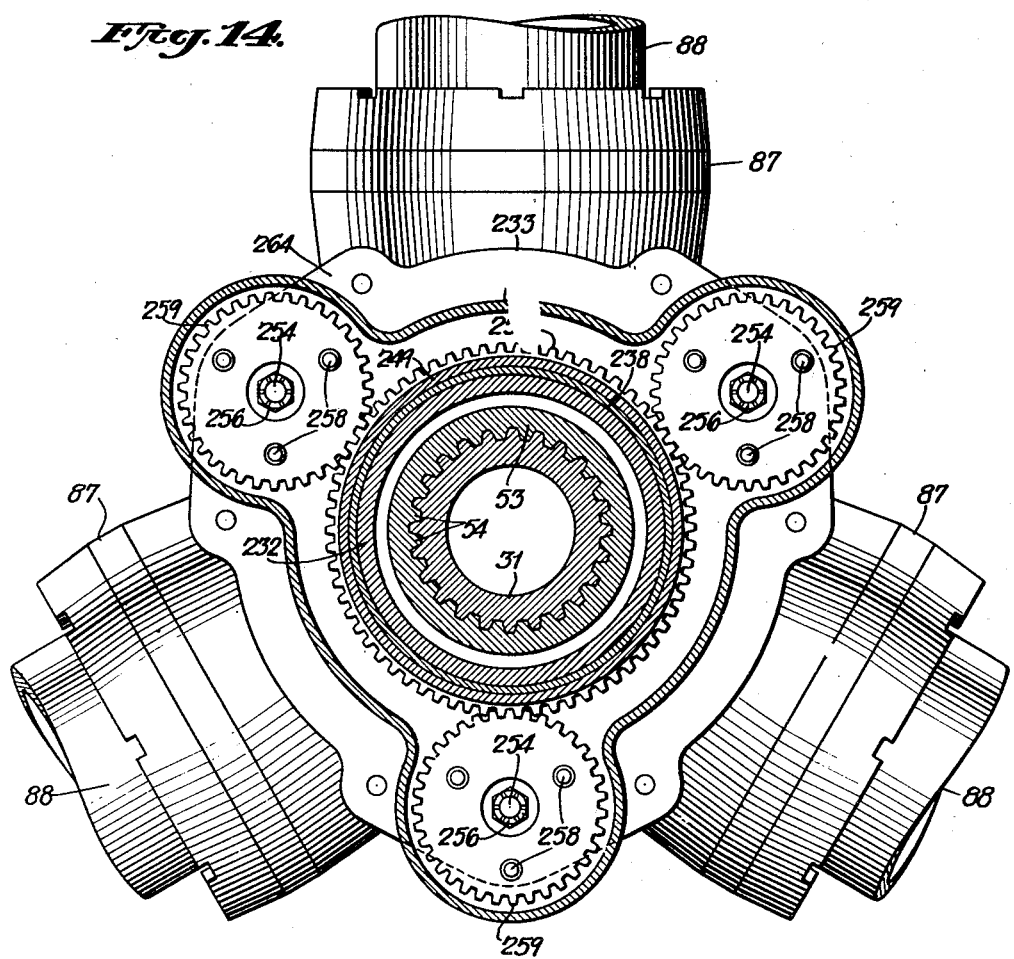
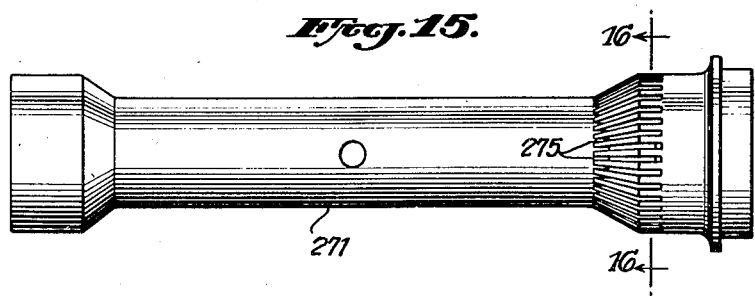
INVENTORS.
GEORGE W. BRADY.
CHARLES W. CHILLSON.
BY
ATTORNEY.

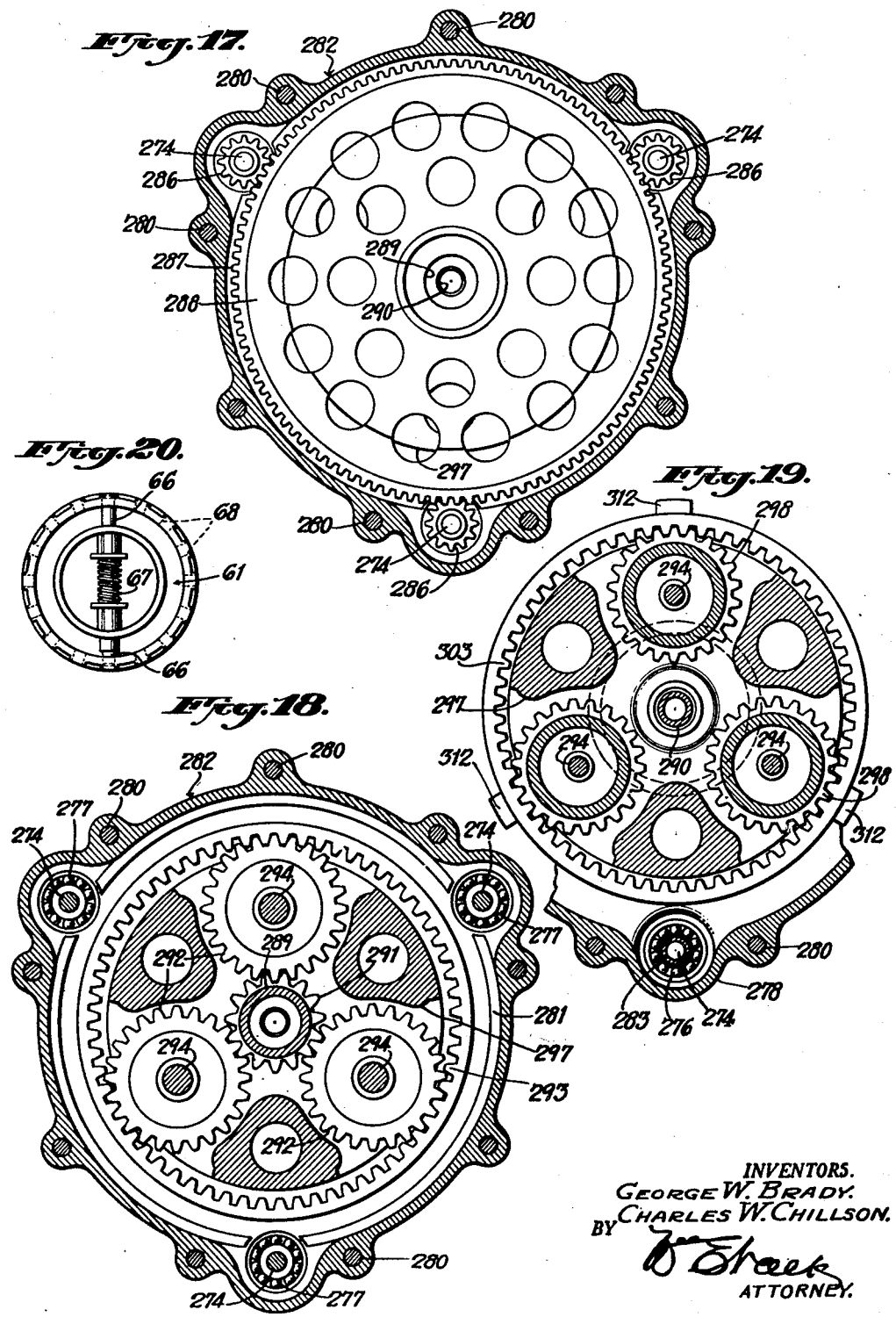

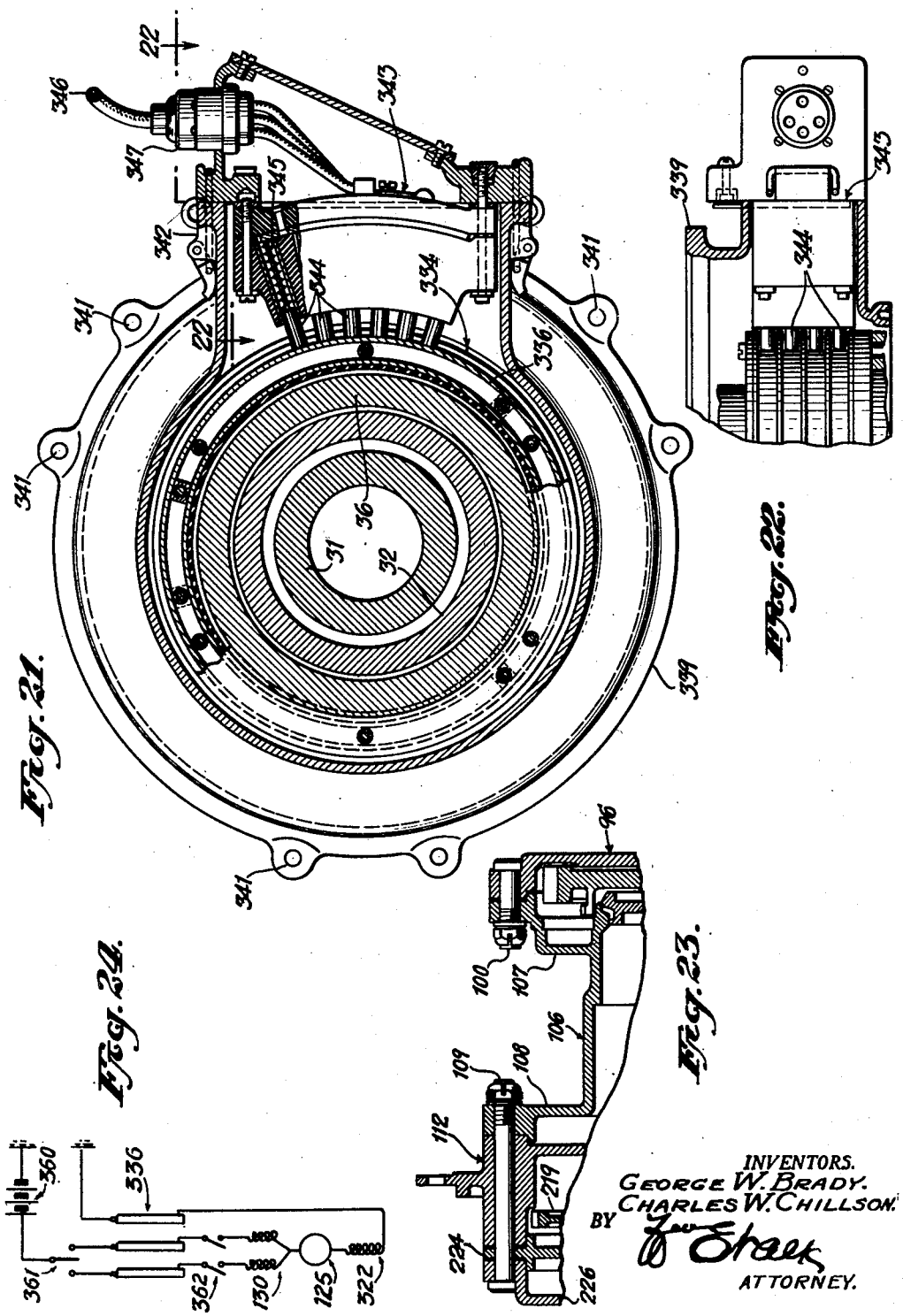

Patented Dec. 12, 1950

2,533,346

UNITED STATES PATENT OFFICE 2,533,346

DUAL ROTATION PROPELLER

George W. Brady, Upper Montclair, and Charles W. Chillson, Caldwell, N. J., assignors to Curtiss-Wright Corporation, a corporation of Delaware Application January 19, 1944, Serial No. 519,066

13 Claims. (Cl. 170—135.24)

This invention relates primarily to dual rotation propellers or those consisting of two sets of propeller blades carried in respective hubs coaxially mounted one behind the other and arranged to rotate in opposite directions, and more particularly to the combination of such propellers with pitch-changing or varying mechanisms therefor, whereby the pitch of both sets of propeller blades may be altered as desired.

For a number of reasons well-known to those skilled in the art, dual rotation propellers of the type mentioned above, which consist of two sets of counter-rotational blades, have many advantages over the conventional propeller employing but a single set of blades. Also, for well-known reasons it is highly desirable and in most cases a necessity that the pitch of the propeller blades, whether the propeller is of the dual rotational or the conventional single type, be capable of being varied. Varying the pitch of propeller blades enables the same, in combination with the engine employed to rotate them, to operate more efficiently under greatly varying conditions. For example, when an airplane is taking off, the blades should be in a low pitch position in order that the engine will not be overloaded, whereas at high altitudes the blades should have a relatively high pitch to enable the same to absorb the power of the engine without overspeeding. It is a relatively simple matter to construct pitch-changing mechanisms for single rotation propellers, and many such mechanisms have been used heretofore. However, it will be obvious that to vary the pitch of the dual rotation propeller having two sets of counter-rotational blades requires a pitch-changing mechanism quite different from those employed with single propellers, since in such mechanisms the problems encountered are complicated by reason of the fact that the two sets of blades rotate in opposite directions.

Accordingly, it is one of the primary objects of the present invention to provide a novel and improved dual rotation propeller and pitch varying or changing mechanism therefor wherein the varying of the pitch of the propeller blades is electrically controlled.

In connection with the above, it is a more specific object of the present invention to provide such a dual rotation propeller pitch-changing mechanism wherein a single electric motor is employed in such a manner that the pitch of both sets of propeller blades is altered or varied simultaneously by power furnished from said motor.

Another object of this invention is to provide a dual rotation propeller and a pitch-changing mechanism therefor with a separate gear system for each set of propeller blades which are interconnected through a differential gearing system whereby the pitch-changing movement of one set of blades is coordinated with that of the other.

Still another object of this invention is to provide a dual rotation propeller pitch-changing mechanism of the above type which includes an arrangement for holding the pitch of both sets of blades in the positions to which they are set by said pitch-changing mechanism during non-operating periods of said mechanism.

In connection with the above, it is a more specific object of this invention to provide electromagnetically operated means or braking device for holding the blades of both propellers in fixed pitch positions during the non-operating periods of the pitch-changing mechanism.

Still another object of this invention is to provide a dual rotation propeller pitch-changing mechanism having an interconnected gearing system and employing flexible driving means therein whereby limited transverse movement of one propeller relative to the other is permitted.

Still another object of this invention resides in the provision of means for lubricating the various component elements of a propeller of the above type.

The above and further objects will be more apparent in the following detailed description of the present invention wherein reference is made to the accompanying drawings illustrating the preferred embodiment thereof, and wherein:

Figure 1 is a vertical sectional view, partly in elevation, taken substantially through the longitudinal center axis of a dual rotation propeller with pitch-changing mechanism therefor constructed in accordance with the present invention;

Figs. 2, 3, 4 and 5 are enlarged sectional views of various parts of the propeller and pitch-changing mechanism shown in Fig. 1;

Fig. 6 is an enlarged transverse sectional view, partly in elevation, taken substantially on the line 6—6 of Fig. 1;

Figs. 7, 8 and 9 are transverse sectional views, partly in elevation, taken substantially on the lines 7—7, 8—8 and 9—9, respectively, of Fig. 4 and illustrating the details of one of the inboard speed reduction units;

Figs. 10 and 11 are enlarged transverse sectional views taken substantially on the lines 10—10 and 11—11, respectively of Fig. 1;

Fig. 12 is an enlarged transverse sectional view taken substantially on the line 12—12 of Fig. 3;

Figs. 13 and 14 are enlarged transverse sectional views taken substantially on the lines 13—13 and 14—14, respectively, of Fig. 1;

Fig. 15 is an elevational view of one of the units of the flexible interconnecting members employed to connect the pitch-changing mechanisms of the two sets of blades;

Fig. 16 is a transverse sectional view taken substantially on the line 16—16 of Fig. 15;

Figs. 17, 18 and 19 are transverse vertical sectional views taken substantially on the lines 17—17, 18—18 and 19—19, respectively, of Fig. 1;

Fig. 20 is a vertical sectional view taken substantially on the line 20—20 of Fig. 5;

Fig. 21 is an enlarged transverse sectional view taken substantially on the line 21—21 of Fig. 1;

Fig. 22 is a horizontal sectional view taken substantially on the line 22—22 of Fig. 21;

Fig. 23 is a fragmentary sectional view taken on a plane at a slight angle to the plane of Fig. 3; and Fig. 24 is a circuit diagram.

In general terms, the present invention consists mainly of a composite or compound propeller having two sets of coaxially mounted propeller blades arranged to rotate in opposite directions and a coordinating gearing system interconnecting the pitch-changing mechanisms of the two propellers whereby the pitch of both sets of blades is varied by power derived from a single source. The two sets of propeller blades are carried by associated hubs mounted one behind the other, and while the hubs preferably rotate at the same speed but in opposite directions, such a condition, as will hereinafter be apparent, is not essential for the proper operation of the complete propeller or the pitch-changing mechanism of the present invention. If desired, one propeller hub may rotate at a speed different from the speed of the other, and there need be no fixed relationship between said speeds.

In the embodiment of the invention about to be described, and as illustrated in the drawings, each of the two coaxially mounted hubs carries a set of three propeller blades. It will be obvious, however, that the invention is in no manner limited to this particular number and arrangement of propeller blades, since the principles thereof may be employed in conjunction with or incorporated into a composite propeller of two sets of blades, each of which has a larger or smaller number of blades than three, and one set of blades may consist of a different number than that of the other. For example, instead of the arrangement shown in the accompanying drawings, both sets may consist of two or four blades each, or one set may consist of two blades and the other three.

The complete propeller is hereinafter described as consisting of two individual propeller units, the one nearest the engine together with its associated or component elements being referred to as the inboard propeller, while the one farthest from the engine with its component elements is referred to as the outboard propeller. The blades of each individual propeller are mounted or anchored in sockets in their respective hubs in the usual manner by means of a thrust bearing consisting of a plurality of superimposed rings of ball bearings whereby the blades may rotate or turn about their respective longitudinal axes to vary or change the pitch thereof. A gear, which is generally known as a blade gear, is non-rotatably attached to the shank of each blade. All of the blade gears on each hub mesh with a common driving gear, known as the power gear, which is carried by the hub and concentrically mounted with respect to the propeller-shaft bore thereof.

In the described embodiment of the invention the inboard power gear is driven directly through associated speed-reducing or torque-amplifying gearing by an electric motor, located between the two propeller units, in the same general manner as in the case of an ordinary single electric propeller, the operation of which is well understood in the art. The electric motor is concentrically mounted on the inboard propeller hub and is of the hollow-armature, reversible type, whereby the blades may be turned in either direction in their sockets to increase or decrease the pitch thereof.

The outboard propeller pitch-changing mechanism is a separate unit, but is similar in principle of operation to that of the inboard propeller. It, also, comprises speed-reducing gearing through which the outboard power gear is driven, but since the outboard propeller is arranged to rotate in an opposite direction to the inboard propeller and the electric motor carried thereby, the outboard gearing cannot be directly connected to said motor, as in the case of the inboard propeller. To meet this condition and to properly coordinate both pitch-changing units and enable a single electric motor to furnish the power for varying the pitch of both sets of blades, a so-called inter-gearing mechanism which operates on the differential principle is employed. The inter-gearing mechanism at all times coordinates the pitch-changing movement of one set of blades with that of the other while permitting relative rotation between the pitch-changing units associated therewith, and the arrangement is such that the pitch of both sets of blades increases or decreases simultaneously at the same rate, or at rates differing one from the other in predetermined ratio, as desired.

During rotation of the two propeller units, the centrifugal forces acting on the blades thereof tend to rotate the blades about their longitudinal axes to their low pitch positions and, to prevent such pitch-changing movements of the blades at times when the pitch-changing electric motor is unenergized, magnetically controlled brakes are employed. The electric circuits to the brakes are so arranged that the brakes are released when the motor is energized, and vice versa.

The above brief and general description of some of the principal elements or units included in the mechanism of the present invention and the arrangement thereof is for the purpose of giving a general outline of the invention, and in view thereof the following detailed description, wherein reference is made to the accompanying drawings, may be more readily understood.

Referring now to the drawings and particularly to Figs. 1, 2 and 3, the reference numeral 31 indicates generally the outboard propeller shaft and reference numeral 32 indicates generally the inboard propeller shaft. The outboard and inboard shafts 31 and 32, respectively, are supported in suitable bearings (not shown), which may be located in the housing of the engine employed to rotate said shafts. The shafts are adapted to rotate in opposite directions and are both hollow, with the inboard shaft 32 in the form of a sleeve surrounding the right-hand portion of that part of the outboard shaft shown in the drawings. The inboard shaft 32 has formed thereon external splines 33 adapted to engage cooperating internal splines 34 in the center bore of the inboard propeller hub, indicated generally by reference numeral 36, whereby the hub is secured to the shaft 32 for rotatable movement therewith as a unit. The hub 36 is mounted and centered on the inboard shaft 32 in the usual manner by means of a pair of mounting cones, namely, a rear cone 37 and a front cone 38. The inboard shaft 32 has external threads 39 adjacent its left-hand end adapted to engage internal threads on a so-called inboard shaft nut 41. When the nut 41 is tightened on the shaft 32, the front cone 38 and the rear cone 37, which abuts a radial flange 40 on the shaft, cooperate with conical surfaces on the interior of the inboard hub 36 to thereby center the same on the shaft 32.

The shaft nut 41 is locked to the inboard shaft 32 by a locking ring 42. The ring 42 has external splines 43 thereon which engage internal splines formed on the left-hand end of the nut 41. The locking ring 42 is prevented from rotating relative to the inboard shaft 32 by means of inwardly projecting lugs 44 thereon engaging suitable radial slots in the extreme end of the inboard shaft. The locking ring 42 is placed in position by inserting the same in the space formed therefor after the shaft nut 41 is tightened on the inboard shaft, and since the external splines 43 on the ring are relatively close together, the nut can be locked to the shaft in practically any position. The ring 42 is held in place and prevented from axial movement along the shaft 32 by means of a radially expandable snap ring 46 which expands into a suitable interior groove on the inside of the left-hand end of the nut 41.

With the exception of a relatively small flange 47 formed integrally with the outboard shaft 31 adjacent the end of the inboard shaft, the outside diameter of the outboard shaft is considerably smaller than the inside diameter of the inboard shaft 32 whereby a clearance space represented by the reference numeral 48 is provided between the two shafts substantially throughout the entire length of the inboard shaft. Since the outboard shaft 31 is substantially longer and smaller than the inboard shaft 32, it has more of a tendency to "whip" or flex than the inboard shaft, and in order to keep the flexing of the outboard shaft 31 at a minimum, an intershaft bearing of the ball type, indicated in general by reference numeral 49, is employed. The intershaft bearing 49 is located to the left of the end of the inboard shaft 32. The outer race 51 of the bearing 49 is supported from the inboard shaft 32, through the inboard hub 36 and other elements hereinafter described, while the inner race 52 is mounted directly on the outboard shaft 31.

The outboard hub, indicated generally by reference numeral 53, is secured to the outboard shaft 31 for rotation therewith as a unit by means of interengaging splines 54 and is centered with respect to said shaft by front and rear outboard cones 56 and 57, respectively, in substantially the same manner as the inboard hub 36 is mounted and centered on the inboard shaft 32. An outboard shaft nut 58 in threaded engagement with the outer end of the outboard shaft 31 cooperates with the mounting cones 56 and 57 to hold the hub 53 on said shaft. The right-hand end of the rear cone 57 abuts the left-hand side of the inner race 52 of the intershaft bearing 49, which in turn on its right-hand side abuts a spacing ring 59 which bears against the flange 47 on the outboard shaft.

A nut locking assembly, indicated generally by reference numeral 61, serves to lock the outboard shaft nut 58 to the outboard shaft 31. The locking assembly 61 consists of a cup-shaped cap 62 fitted over the end of the outboard shaft 31 which has one or more rightwardly extending fingers such as 63 adapted to engage suitable notches or slots 64 in the periphery of the shaft adjacent the threaded portion thereof. The locking assembly 61, Figs. 1, 5 and 20, also includes a pair of diametrically opposite telescoping pins 66 which are urged radially outward by a compression spring 67 whereby the ends enter radial holes 68 in the outboard shaft nut 58. The pins 66 engaging the shaft nut 58 prevent the same from turning relative to the locking assembly 61, while the finger 63 engaging one of the slots 64 in the shaft 31 prevents the locking assembly from turning relative to the shaft. Thus, the shaft nut 58 is locked to the outboard shaft, and as the number of radial holes 68 in the shaft nut is different from the number of slots 64 in the shaft, the nut 58 can be locked to the shaft 31 in practically any position to which it may be tightened thereon.

The inboard hub 36 has spaced around the periphery thereof substantially 120° apart, as shown more clearly in Fig. 6, three substantially radially extending open-ended blade sockets 69. Each blade socket has mounted therein in a conventional manner well known in the art the shank of an associated propeller blade 71. The blade mounting elements include a so-called blade gear 72, Fig. 2, threaded into the inside open shank end of the propeller blade and locked thereto by a pin 73. The radial thrust on each blade developed during rotation of the propeller is resisted by a thrust bearing indicated generally by reference numeral 74, consisting of a plurality of ball bearings arranged in a stack as shown. The inner ball race of the lower bearing, Fig. 2, engages a shoulder 76 on the blade gear 72, while the outer ball race of the uppermost bearing is engaged by the lower side of a nut 77. The nut 77 is threaded into the upper end of the blade socket 69 and is locked therein in a well-known manner by locking means which may include keys 78 located in opposite radial slots in the upper surface of the blade socket and the nut, the keys being held in place by screws 79. The thrust bearing 74 permit the propeller blades 71 to rotate in their respective sockets 69 about the longitudinal axes thereof, whereby the pitch of the blades is changed. The manner in which this rotating movement of the blades is effected will be described hereinafter.

An insert 81 placed in the lower part of the blade gear 72 is faced with suitable resilient material 82, such as fiber or some similar substance, which bears against a suitable mating surface 83 of the propeller hub 36. When the nut 77 is tightened, the thrust produced thereby is transmitted through the thrust bearing 74, the blade gear 72, the insert 81 and the resilient material 82 to the surface 83 of the hub 36, and in this manner the thrust bearing may be preloaded. Suitable circular packing rings or seals 84 and 86 are associated with the nut 77, the blade shank 71 and the upper end of the blade socket 69 to prevent the escape of lubricant carried in the blade socket. The lubricant is provided in order to lubricate the thrust bearing 74 and other relatively moving elements carried by the hub. If the seals 84 and 86 were not provided, centrifugal force acting on the lubricant as the propeller rotates would force the same out of the blade sockets.

The outboard propeller hub 53 also has three blade sockets such as 87, Figs. 1, 5 and 14, similar to the blade sockets 69 of the inboard hub 36, and each has mounted therein an associated propeller blade 88. The blades 88 are rotatably secured in their respective sockets 87 in substantially the same manner as the inboard propeller blades. The blade mounting elements of the outboard propeller include thrust bearings such as 89, blade nuts 91 and blade gears 92 fixed to and rotatable with their associated blades 88.

The forward or left-hand end, as shown in Figs. 1, 2 and 3, of the inboard hub 36 terminates in a flat radial surface 93 of relatively large diameter surrounding the shaft 32. Secured to the surface 93, by bolts such as 94, and located by dowel pins 95, is a so-called spur gear housing 96 and a so-called intershaft bearing housing 97. The spur gear housing 96 has a pair of circular flanges 98 which form a recess for and thus center the housing on the left-hand end of the hub. A circular seal 99 forms a tight fit between the hub and the housing. Opposite the circular surface 93 of the hub 36, the housing 96 has three leftwardly extending kidney-shaped projections 101, Figs. 1, 3 and 6. The projections 101 are substantially 120° apart around the left-hand face of the housing 96, and each occupies substantially 50° of the circumference thereof. It is against these kidney-shaped projections 101 that the intershaft bearing housing 97 is clamped by the bolts 94. The latter housing 97 has axially extending circular flanges 102 which engage the inner and outer diameters of the kidney-shaped projections to insure correct alignment of the two members.

The bolts 94 employed to clamp the above-mentioned housing members to the left-hand face or surface 93 of the inboard hub 36 are preferably hollow, as shown in the fragmentary section thereof in Fig. 2, with the heads 94a thereof to the left and the cooperating nuts 94b at the right. The hollow bolts 94 provide a convenient means whereby electrical connections can be established between the hereinafter described slip rings, on the inboard end of the hub 36, and the pitch-change motor, generally designated by reference numeral 125, at the outboard end of said hub.

Secured to the outer part of the left-hand face of the spur gear housing 96 by suitable bolts, such as 100 and 103, Figs. 1, 3, 4, 6 and 23, and located by dowel pins such as 104, is the center section of the pitch-change motor housing, indicated generally by reference numeral 106. The pitch-change motor housing 106 is generally cylindrical with the axis thereof concentric with that of the propeller shafts, and has radially extending flanges 107 and 108 at its right and left-hand ends respectively. The outer rim of the right-hand flange 107 of the housing 106 abuts the spur gear housing 96, while the outer rim of the left-hand flange 108 has secured thereto by bolts such as 109, Fig. 23, and dowel pins such as 111, a generally cylindrical, flanged housing member 112. The member 112, as best shown in Figs. 1 and 3, serves as a housing unit for the left-hand end of the pitch-change motor and also as the right-hand portion of the housing unit for the hereinafter-described inter-gearing mechanism. The housing member 112 has a rightwardly extending cylindrical section 113 in the central portion thereof which terminates in an inwardly extending radial flange 114. To the flange 114 is secured by machine screws 116 the left-hand flanged end of the intershaft bearing housing 97. Thus, the intershaft bearing housing 97, the motor housing 106 and the housing member 112 form a toroidal-shaped cavity in which is mounted, in a manner hereinafter pointed out, the pitch-change motor of the power unit.

It is now also apparent, from the above described arrangement of housings, that because the housing 97 surrounds and supports the outer race 51 of the intershaft bearing 49, and because the housing 97 is secured through the housing 96 to the inboard hub 36, which in turn is supported by the inboard shaft 32, said shaft 32 actually constitutes the primary support for said outer race 51 of said bearing 49, the inner race 52 of which is mounted directly on the outboard shaft 31, the bearing 49 thus forming a true interbearing between said two shafts.

The cylindrical section 113 of the housing member 112 carries on the outer periphery thereof the inner race 118 of the pitch-change motor armature bearing, indicated generally by reference numeral 119. The armature bearing 119 is a double row ball bearing, and the outer race 121 thereof is carried on the inside of the motor armature shell 122. An externally threaded nut 123 is threaded in the shell 122 and clamps the race 121 of the armature bearing against an inwardly extending radial flange 124 on the armature shell. The armature of the motor is indicated generally by reference numeral 126 and includes, in addition to the armature shell 122, the armature windings 127, the armature commutator segments 128 and the mounting ring 129 for said windings and segments; said ring being fixedly secured to the armature shell 122 as by a tight press fit therewith. Thus, the hollow armature 126 of the pitch-change motor is rotatably supported, through the housing members previously enumerated, by the inboard hub 36, and is, therefore, adapted to rotate about an axis concentric with that of the inboard propeller shaft 32.

The field coils of the pitch-change motor indicated by reference numeral 130 are wound about the poles 131 secured by screws 132 to the inside of a mounting ring 133 therefor, which, in turn, is secured to the motor housing 106 in a manner hereinafter pointed out. Motor brushes such as 134 engage the right-hand radial surfaces of the commutator segments 128 and are supported on the inner or lower ends, as shown in Fig. 3, of depending arms 135 of brush holders 136; the arms 135 being substantialy radial to the axis of rotation of the armature and propellers. The brush holders 136 are pivotally supported on pins 137 carried in the center section of the motor housing 106. The pins 137 are at right angles to the axis of the armature and propeller shafts, and permit the brush holders 136 to pivot in planes such as the plane of the section of Fig. 3. Each of the brush holders 136 has a cooperating compression spring 138 which tends to pivot the brush arms to hold the brushes 134 in engagement with the commutator segments 128. Suitable slots are formed in the motor housing 106 for mounting the brush holders 136 and for permitting the arms 135 thereof to extend through the wall of said housing.

The left-hand end of the armature shell 122, as shown in Fig. 3, flares outwardly, and formed integrally on the end thereof is a spur gear 139. The gear 139, which constitutes the armature or drive gear of the pitch-change motor, is concentric with the propeller shafts and has in engagement therewith three spur gears 141, located approximately 120° apart around the periphery of the armature gear 139. Each of the gears 141, as shown in Fig. 4, is secured by rivets, such as 142, to the flange 143 of an associated hollow shaft 144; a construction which permits of the use of a non-metallic gear, if desired. There are, of course, three such hollow shafts 144, and hereinafter where the elements associated with but one of these are described, it is to be understood that each of the others has a similar set of associated elements. The hollow shafts 144, as shown in Fig. 4, are journaled parallel to the propeller shafts in ball bearings 146 to the left of the flanges 143 thereof, which in turn are supported in bushings 147 carried in the housing member 112. As shown in Figs. 1 and 4, the housing member 112 has cup-shaped sections 148 adjacent the periphery thereof which cooperate with similar sections 150, Figs. 1 and 4, on the forward flange of the motor housing 106 to form housings for the gears 141.

Three relatively small inboard pitch-change speed reducers are driven directly by the hollow shafts 144, which also drive a single relatively large outboard pitch-change speed reducer through the medium of the hereinbefore mentioned inter-gearing mechanism. The inboard propeller speed reducers are indicated generally by reference numeral 149. Figs. 1 and 4 show in longitudinal section one such speed reducer, while Figs. 7, 8 and 9 show various transverse sections thereof, and Fig. 6 shows the forward end of all three and the relative positions thereof with respect to the propeller shafts. The spur gear housing 96 and the right-hand end of the motor housing 106 each have adjacent the outer rims thereof three similar sections 151 and 152, respectively, which form the main supporting and housing members for the speed reducers 149.

The right-hand end of each hollow shaft 144, as shown in Fig. 4, is supported by the left-hand end of a drive shaft 153 associated with the inboard speed reducer 149. The hollow shaft 144 is non-rotatably connected with the shaft 153 by means of a splined sleeve coupling 154, which engages splines on the adjacent ends of said shafts. The drive shaft 153 of each speed reducer 149 has keyed to its inboard or right-hand end, as shown in Figs. 1 and 4, a spur gear 155, which constitutes the sun gear of a planetary gear system. The sun gear 155, which is held on the shaft 153 by a nut 156 in threaded engagement therewith, meshes with two planet gears 157, which in turn mesh with an internal ring gear 158, as best shown in Fig. 9. The ring gear 158 is formed integral with the center frame member 159 of the housing of the speed reducer 149.

Referring again to the frame member 159 of the housing of the speed reducer 149, shown in detail in Figs. 1, 4, 7, 8 and 9, it will be noted that one of said members is fixed to the right-hand or open end of each section 152 of the housing 96 by bolts or screws such as 161. In addition to holding the frame member 159 to the section 152, the bolts or screws 161 hold a cap 162 against said member to close the inboard end of each housing section 152.

The planet gears 157, which engage opposite sides of the sun gear 155 and the ring gear 158, are rotatably mounted on shafts 163 by means of ball bearings 164. The shafts 163 are supported by a radially extending flange or spider 166 of a sleeve member indicated generally by reference numeral 167. The sleeve member 167 surrounds the right-hand portion of the drive shaft 153 and is rotatable independently thereof.

The sleeve member 167 is journalled in a ball bearing 168 which in turn is supported in the center section 169 of the frame member 159. The sleeve member 167 in turn supports, in the flared right-hand end thereof, a ball bearing 171, which supports the drive shaft 153 as shown.

The sleeve member 167 has formed integrally therewith adjacent its left-hand end a spur gear 172 which constitutes the sun gear of a second planetary gear system. As shown in Figs. 4 and 7, the sun gear 172 meshes with a set of planet gears 173, each of which has formed integrally and concentrically therewith another planet gear 174 of slightly smaller pitch diameter. Each pair of planet gears 173 and 174 is mounted on a short shaft 176 which is journalled in ball bearings such as 177. The bearings 177 are carried in a spider member 178 which is journalled concentrically with the drive shaft 153 on bushings 179 and 181. The bushing 181 is supported on a centrally disposed leftwardly extending sleeve portion 182 of the frame member 159. The bushing 179 is supported on a centrally disposed section 183 of a sleeve member 184, which surrounds but is not in contact with the shaft 153. As shown, the sleeve 183 supports a bushing 186 which serves as a bearing for the left-hand end of the sleeve member 167.

At its right-hand end, the sleeve 184 has formed integrally therewith an internal ring gear 188, which meshes with the planet gears 173. Another internal ring gear 189 formed integrally with the housing frame member 159 meshes with the planet gears 174.

The sleeve member 184 has formed adjacent the left-hand end thereof external splines 191 which engage internal splines 192 on the hub 193 of a pinion 194. The hub 193 is journalled in two ball bearings 196 which are supported in the sections 151 and 152 of the housing members 96 and 106. The hub 193 supports in its left-hand end a ball bearing 197 in which is journalled the left-hand end portion of the drive shaft 153. As best shown in Figs. 1, 3, 4 and 6, the pinion 194 of each of the three speed reducer units 149 meshes with a large gear 198 mounted concentrically with the inboard propeller shaft 32. The gear 198 is rotatable with respect to said shaft and has a leftwardly extending hub portion 199, Fig. 3, journalled in a bushing 201 supported by the innermost flange 102 of the housing member 97. The gear 198 occupies the space formed by the spur gear housing 96, the intershaft bearing housing 97 and the flange 107 of the motor housing 106.

As shown most clearly in Fig. 6, the gear 198 has three kidney-shaped holes or slots 203 in the web portion thereof through which extend the three kidney-shaped projections 101 of the housing 96. The slots 203 are considerably longer than the projections 101 and, therefore, appreciable rotation of the gear 198 is permitted. The bore of the gear 198 has splines 204 cut therein, and these splines engage cooperating external splines on the left end, Figs. 1, 3 and 6, of the hub 206 of a bevel gear 207 that meshes with all of the blade gears 72, each of which comprises a bevel gear segment 209, Figs. 1, 2, 3 and 6, adapted to mate with said gear 207.

A spacing ring 208 surrounding the hub 206 rotatably supports the gear 207 as shown and also positions the same with respect to the bevel gear segments 209 by means of shims 208a, Fig. 3,. interposed between said ring and said gear 207.

The amount, which may be varied at will, that the spur gear 198 and the bevel gear 207 splined thereto may rotate in the illustrated design, as determined by the relative lengths of the kidney-shaped projections 101 and the similarly shaped slots 203 in the web of the gear 198, is sufficient to produce the maximum desired pitch change of the blades. With the arrangement shown, the blades may be rotated from a position of about 15° positive pitch to a full feathering or 90° pitch position.

The previously mentioned differential gearing or so-called inter-gearing, which constitutes an important feature of the present invention, and which is utilized, among other purposes, for coordinating the action of the inboard and outboard pitch-changing units, is hereinafter generally referred to and indicated in the drawings by reference numeral 211. The complete intergearing mechanism is positioned as shown in Figs. 1 and 3 to the left of the pitch-change motor which includes the armature 126 and its hereinbefore described associated elements. For reasons which will presently be explained, it is desirable that the driving connections between the inter-gearing and each of the three inboard pitch-change mechanisms 149, Figs. 1 and 3, be of a flexible or resilient nature. Accordingly, small-diameter, relatively long and suitably supported flexible shafts 212, Fig. 4, which are termed torsion rods, are employed for this purpose.

One of these torsion rods 212 is associated with each of the pitch-change units 149 and is mounted within the hollow drive shaft 144 connected therewith. Each torsion rod 212 is pinned by a shear pin such as 213 to the right-hand end of its associated hollow shaft 144, and to the left-hand end of each rod is secured by means of a pin 214 a pinion 216. A longitudinally split sleeve 217 of suitable non-metallic material snugly surrounds each rod 212 intermediate the enlarged ends thereof, substantially filling the annular space between the rod and the hollow shaft 144. This construction obviously prevents transverse flexure of the torsion rod due to the action of centrifugal force thereon during rotation of the propeller or other causes.

The three pinions 216 on the left-hand ends of the torsion rods 212, as best shown in Figs. 4 and 11, mesh with a large spur gear 218 formed on the outer periphery of a circular member 219 mounted concentrically with the inboard propeller hub 36. As the three pinions 216, which are intended to cooperate with each other to drive the gear 218, are all driven by a common gear, namely, the motor armature gear 139, through the medium of the gears 141 and shafts 144 and 212, it is obvious that the manufacturing tolerances of all of said parts and associated members would of necessity be extremely limited if the three separate driving connections between the gears 139 and 218 were rigid. Accordingly, the flexible torsion rods 212 are provided in these three driving connections, so that if the teeth on one or more of the pinions 216 fail to line up properly for engagement with the teeth of the gear 218, such misalignment may be readily compensated for by the slight rotation of said pinion or pinions permitted by the flexibility of said torsion rods or shafts 212.

The shear pins 213 connecting the right-hand ends of the hollow shafts 144 with the torsion rods 212 are provided to prevent any possible damage to the inter-gearing mechanism or the elements operatively connected therewith should they become over-loaded due to extraordinary conditions.

The gear 218 which is integral with the circular member 219, Figs. 3, 4, 11 and 12, is directly and rotatably supported on a bearing comprising a circular row of balls 221 which are supported by a race 222. The race 222 is secured by rivets 223 to a flanged circular forging 224. The forging 224 and an inter-gearing housing member 226 are secured by the bolts 109, Fig. 23, to the left-hand end of the motor housing member 112.

The race 222 also serves as the outer race of a second ball bearing 227 which rotatably supports an annular member 228, hereinafter referred to as the inter-gearing spider. The inner periphery of the spider 228 is formed to serve as the outer race of a third ball bearing 229, the inner race 231, of which supports the sleeve portion 232 of a flanged inter-gearing housing member 233. The sleeve 232 surrounds the right-hand sleeve portion of the outboard hub 53 but is out of engagement therewith to the extent of about $\tfrac{1}{8}$ inch radially as shown in the accompanying drawings. A nut 234 which is threaded on the right-hand end of the sleeve 232 clamps thereon an oil slinger disc 235, a gear 236, the ball race 231, a spacer ring 237 and a bearing bushing 238, in the order named. The gear 236 which surrounds and is mounted on the sleeve portion 232 of the housing member 233 is also secured thereto by means of a key 239.

The housing member 233 is arranged to rotate with the outboard propeller hub in a manner hereinafter described, but is positively carried by and rotatably mounted on the inboard propeller hub through the medium of the two ball bearings 229 and 227 which are supported by the hub 36 through the housing member 112, as previously explained herein.

As stated in the first part of this specification, the inboard and outboard pitch-changing units embodied in the present invention are interconnected by differential gearing, above referred to as the inter-gearing mechanism 211, which may be of either the spur-gear or bevel-gear type. If of the spur-gear type, it will be understood that the spur-gears may be toothed either externally or internally. In the preferred form of the invention, this differential gearing is of the spur-gear type, as is best shown in Figs. 3 and 11, and comprises a double planetary gear system consisting of two sun gears, two sets of planet gears and two internal ring gears meshing respectively with said two sets of planet gears. The previously mentioned gear 236 is one of the sun gears of said system and is concentrically mounted on the sleeve 232 to which it is non-rotatably secured in the manner described. The other sun gear 248, of said system, is also concentrically mounted on the sleeve 232, but is free to rotate relatively thereto on the bearing 238. As shown, both sun gears have the same pitch diameter. The sun gear 236 meshes with one set of planet gears 243 rotatably supported by ball bearings 242 carried on stub shafts 241 secured, as shown, to the spider 228. The sun gear 248 meshes with another set of planet gears 244, similarly but independently mounted on the opposite side of said spider. All planet gears 243 and 244 have the same pitch diameter. The planet gears 243 mesh with an internal ring gear 246, which is formed integral with the member 219 and gear 218, while the planet gears 244 mesh with an internal ring gear 247, which is formed integral with the forging 224 secured to the housing member 112.

The sun gear 248 is formed integral with a sleeve member 249 to the left thereof, Figs. 3 and 4, and around the left end of said sleeve is formed a gear 251 also integral therewith and generally similar to the gear 248. The gear 251 meshes with three symmetrically disposed gears 259, Figs. 3, 4 and 14. Each gear 259 is secured by rivets 258 to a flanged hub 257 which is secured to a shaft 254 by a key 255 and a nut 256; a construction which permits of the use of a non-metallic gear, if desired. Each shaft 254 is supported by ball bearings 253 carried by a suitable extension 252 of the housing member 233, which is rotatably mounted on a bearing supported indirectly but positively by the inboard propeller hub, as previously explained herein.

The gears 259 are located a slight distance to the left of the radial flange section 261 of the housing member 226 which has on the inner diameter thereof labyrinth sections 262. The labyrinth sections 262 in cooperation with a similar section 260 on the sleeve member 249 are provided to prevent or minimize the escape of oil or other lubricant from the inter-gearing mechanism 211.

Non-rotatably secured to the outboard hub 53 by suitable means such as bolts or cap screws is a flanged casting 264, Figs. 4 and 14, which has in the outer section thereof three open-end cylindrical extensions 266 spaced 120° apart and normally respectively concentric with the shafts 254 which pass freely therethrough. A ball bearing 268 is mounted on an extension 268a of the housing member 233 loosely surrounding each shaft 254. Vulcanized or otherwise suitably secured to the inner surface of each cylindrical extension 266 of the casting 264 is a buffer ring 267 of rubber or other pliant material adapted to engage the outer race of the ball bearing 268 when the clearance, which is plainly indicated in Fig. 4, between said ring and said race is taken up by relative rotary movement between the member 233 and the casting 264. Obviously, by this arrangement the inter-gearing housing member 233, which is rotatably supported from the inboard hub 36 in the manner hereinbefore described, is constrained to rotate with the outboard hub 53 when the propellers are in operation. The difference between the inside diameter of the buffer ring 267 and the outside diameter of the outer race of the ball bearing 268 is comparatively small so that only a negligible amount of relative rotation between the casting 264 and the housing member 233 is permitted. This difference in diameters or clearance is provided to prevent interference with the operation of the pitch-change gearing when relative flexure occurs between the inboard and outboard propeller shafts 32 and 31 respectively.

The left-hand end of each shaft 254, Fig. 4, has keyed or splined thereto a metal sleeve 265, to the outside of which is vulcanized a rubber or other pliant material bushing 269. A second metal sleeve 270 is vulcanized to the outside of each bushing 269, and the left-hand end of each sleeve 270 is provided with teeth or projections adapted to engage axial slots or keyways 275, Figs. 15 and 16, adjacent the right-hand end of an associated metal tube 271. The tubes 271 have enlarged ends, and each metal sleeve 270 with the attached rubber bushing 269 is secured to its associated tube 271 by means of a nut 272 in threaded engagement with the right-hand end thereof. Into the left-hand end of each metal tube 271 is tightly pressed a sleeve 273a, Fig. 5, vulcanized to the outside of an associated rubber or other pliant material bushing 273. Each bushing 273 is vulcanized to an internal sleeve 274a, which is secured by keys or splines to an associated drive shaft 274. By means of the construction above described, it is obvious that there is provided a flexible driving connection between the shafts 254 and 274, Figs. 4 and 5, that permits of both axial misalignment and slight torsional movement between said shafts, which may be rendered necessary by relative flexure between the inboard and outboard propeller shafts or by other causes, such as manufacturing inaccuracies.

The shafts 274, of which there are three, are journalled adjacent the center sections thereof in ball bearings 276 and 277. The ball bearings 276, Fig. 5, are carried by the right-hand portion of a housing 278 that supports the outboard speed reducer which is indicated generally by reference numeral 279. The housing 278 is secured by suitable means such as bolts or screws to the front end of the outboard hub 53. The ball bearings 277 are supported by a disc forging 281 suitably secured, together with a cover casting 282 by bolts such as 280 to the forward or left-hand end, as shown in Figs. 1 and 5, of the housing 278. Located around each shaft 274 and between the ball bearings 276 and 277 is a sleeve 283 and a compression spring 284. As is evident from the drawings, this sleeve and spring serve as a flexible spacer to hold the bearings 276 and 277 in place longitudinally in their respective supports. The inner races of said bearings, the sleeve 283 and the spring 284 all fit slidably on the shaft 274 which, therefore, is free to move longitudinally with respect to the housing 278. This construction prevents binding of the parts concerned if the propeller hubs move out of mutual alignment, and it also eliminates the necessity for close manufacturing tolerances.

The shafts 274 constitute the drive shafts for the outboard speed reducer 279, Figs. 1, 5, 17, 18 and 19, and each has pinned to the forward end thereoef a pinion 286 that meshes with a relatively large spur gear 287 journaled concentrically, as shown, with the outboard propeller shaft 31. Formed integral with the gear 287 is a pinion 291 which constitutes the sun gear of a planetary system. The sun gear 291, as best shown in Fig. 18, meshes with a set of planet gears 292, which in turn mesh with an internal ring gear 293 formed integral with the disc forging 281 which, as previously stated, is bolted to the housing 278. Each of the planet gears 292 is mounted on a shaft 294 journaled on a pair of ball bearings 296, carried by a casting or spider 297, which is concentrically journalled, as shown, with the gear 287 for free rotation relative thereto on bearings 299 and 301. The spider 297 also carries a central bearing 300 which rotatably supports an extension 290 of the hub of the integral gears 287 and 291.

Formed integral with each of the planet gears 292 is a secondary planet gear 298, Figs. 5 and 19, of slightly smaller pitch diameter. These secondary planet gears mesh with a relatively large internal ring gear 303 having a hollow hub 304 rotatably supported by bearings 309 and 311 carried by the housing 278. The inner race of the bearing 309 is not mounted directly on the hub 304 but on the hub of a bevel gear 308 that is fitted thereto and drivably connected therewith by splines 306 and 307, as best shown in Fig. 5, where it will be noted that the gear 303 has a central extension 302 which serves to support the previously mentioned bearing 301. The bevel gear 308 meshes with all of the blade gear segments 310 formed integral with the several blade gears 92 attached to the blades 88 of the outboard propeller, as shown in Figs. 1, 5 and 14.

Referring to Fig. 5, it will be noted that the geear 303 is shown as having a lug 312 extending radially therefrom. There are three such lugs located substantially 120° apart and, extending into the path of movement of these lugs as the gear 303 rotates, are three similar lugs 313 formed integral with the disc forging 281 which, as previously explained, is bolted to the housing 278. It is evident from an inspection of Fig. 5 that these two sets of lugs cooperate to limit the amount of rotation of the gear 303, so as to eliminate the possibility of changing the pitch of the propeller blades beyond safe limits for normal operation.

Fixed to the forward face of the inter-gearing spider 228, Figs. 3 and 13, by screws 315 are diametrically opposite brackets 314 and 316 which have secured thereto associated oil scooping tubes 317 and 318, respectively. The outer ends of the tubes 317 and 318 terminate adjacent the inside diameter of the housing member 226 and are curved as shown so that oil or other liquid lubricant in said housing will be scooped up by the tubes when the propellers are rotating and conveyed to various parts of the inter-gearing mechanism.

A magnetic brake mechanism is employed in the preferred embodiment of the invention to stop and hold the armature of the pitch-change motor against rotation relative to its field when the circuit thereto is opened after any desired amount of change in the pitch of the propeller blades has been effected. The electric circuit to the magnetic brake mechanism which is spring applied is preferably included in the circuit of the pitch-change motor and is so arranged that the brake is released when the motor is energized.

The brake mechanism includes three electromagnetic units, one of which is shown in Figs. 1, 3 and 4, wherein it is indicated generally by reference numeral 319. The magnetic coils 322 are wound on a flanged core 323 which surrounds the hollow shafts 144 but is out of contact therewith and is secured to the flange section 108 of the motor housing 106 by a plurality of screws such as 321.

Interposed between the magnetic units 319 and the flanges 143 of the shafts 144 is a flexible brake plate 324, generally triangular in shape and having a central bore adapted to clear the motor field coils 130, Figs. 3, 4 and 10. This plate 324, which is made of iron or other magnetic material, is secured at three central points by screws such as 326 to the open left-hand end of the motor housing 106, and has substantially circular sections 328 at the corners thereof to which are attached by means of rivets, such as 329, disc-shaped sections 331 of suitable brake lining material. Each of the brake discs 331 is located on the brake plate 324 in such a position that it surrounds one of the hollow shafts 144 and is adapted to cooperate with the metal flange 143 thereof to exert a braking action thereon.

During an unenergized condition of the magnetic units 319, compression springs 332, only one of which is partly shown in Fig. 4, are adapted to flex the brake plate 324 and press the corners thereof carrying the brake discs 331 against the right-hand faces of the three shaft flanges 143 and thereby prevent the same from rotating. The left end of each compression spring 332 is mounted in a recess such as 333 formed in the brake plate 324 and the opposite end of each spring is located in a suitable bore formed in the outer left-hand end of the motor housing 106. When the circuit of the pitch-change motor 125 is completed, the brake coils 322 are energized, since they are included in the motor circuit, and the magnetic action thereof moves the flexible plate 324 to the right, as shown in Fig. 4, against the action of the compression springs 332, thus drawing the brake discs 331 out of engagement with the flanges 143 of the hollow shafts 144, which are then free to rotate. When the motor circuit is opened, the coils 322 are deenergized and the springs 332 are then effective to reapply the brakes.

Suitably secured to the inboard or right-hand side of the inboard hub 36 is a slip ring assembly, indicated generally by reference numeral 334, Figs. 2 and 21. This assembly consists of a plurality of slip rings 336 of suitable electrical conducting material separated by insulating discs 337 mounted on an insulating sleeve 338. The slip rings 336 are electrically connected through suitable circuits to the proper terminals of the magnetic brakes and the pitch-change motor in a manner well-known in the art, and, therefore, a detailed description thereof will not be included herein. Limit switches, also well-known in the art, may be employed in the pitch-change motor circuit to open it when the pitch of the propeller blades has been altered to a desired limiting value in either direction. Such switches prevent damage to the pitch-changing mechanism and are automatic in operation.

A slip-ring housing 339 is bolted to the front end of the associated engine (not shown) by bolts extending through holes such as 341, Fig. 21. The housing 339 has an opening in the right-hand side thereof, as shown in Fig. 21, and to this opening is clamped by means of trunk type clamps 342 a brush assembly 343, Figs. 21 and 22. The brush assembly 343 includes brushes 344 which under the influence of springs 345 are adapted to engage the slip rings 336 and establish electrical connections between the slip rings and the conductors of a cable 346. The cable 346 is connected to the brush holder assembly through a connector 347. The connector 347 and the clamps 342 enable the brush assembly 343 to be completely and quickly removed from the propeller unit and cable 346.

It will be obvious to those familiar with devices such as those disclosed herein that it is essential that various of the relatively moving parts of the propeller be thoroughly lubricated. In the disclosed embodiment of the invention, for example, the planet gears 243 and 244 of the differential inter-gearing mechanism 211 are continuously rotating with respect to their associated gears during rotation of the propeller hubs, even at times when no pitch change is being effected. If such gears and various other elements of the propeller were not properly lubricated, excessive wear and damage thereto would soon result. Accordingly, provisions are made whereby the various sub-units of the complete propeller assembly are lubricated and the lubricant is retained therein by the use of suitable seals, gaskets, etc. For example, the outboard propeller speed reducer 279 contains a lubricant which is retained therein by means of a seal ring 348, Fig. 5, surrounding the hub of the gear 303 and by other seals such as 349 around the shafts 274 of the speed reducer.

Other seals such as 351 and 352, Fig. 5, cooperate with the outboard shaft nut 58 and the lock assembly 61 to retain lubricant in the outboard hub blade sockets. The inboard shaft nut 41, Figs. 2 and 3, has seals 353 and 354 associated therewith which retain lubricant in the inboard hub blade sockets. The shafts 153, Fig. 4, of the inboard speed reducers 149 have seals 356 to prevent the escape of the lubricant carried in the housing 152. In addition to the above-mentioned seals, which cooperate with the rotating elements, the joining surfaces of the various housing and framing members are provided with suitable seals, gaskets, etc., where such are necessary.

The inter-gearing mechanism 271 is lubricated by a quantity of lubricant which only partially fills the same, and the lubricant is distributed to various moving parts thereof by means of the oil scooping tubes 317 and 318 in the manner previously described herein. Lubricant which may tend to flow out of the inter-gearing mechanism through the passageway between the outboard hub 53 and the sleeve portion 232 of the housing member 233, at such times as when the shafts are not rotating, will be partially or completely returned to the inter-gearing mechanism as soon as the shaft rotates, due to the following construction. The sleeve portion of the outboard hub that is located within the sleeve 232 has a plurality of slightly raised radial flanges 358, Fig. 3, and lubricant which may be on the outside of the hub will collect at the flanges and be thrown by centrifugal action against corresponding depressions on the inside diameter of the sleeve 232 which connect with a series of radial holes such as 359 opposite the flanges 358 whereby the lubricant thrown against the sleeve may be returned to the inter-gearing mechanism and in so doing incidentally lubricate parts which might not otherwise be lubricated.

From the foregoing description it will be noted that the complete propeller assembly is divided into a number of sub-units and the arrangement and construction of the various sub-units is such that for the most part they may be removed as units from the complete assembly. Such an arrangement greatly facilitates servicing, maintenance and repair of the complete assembly, since a sub-unit which may be damaged or out of order may be easily and quickly removed and replaced by a new or repaired unit. For example, should the outboard speed reducer 279, Fig. 5, be damaged or fail to operate properly, the entire unit could be quickly removed and replaced by merely removing the cap screws holding the same to the forward end of the outboard propeller and by unthreading the nuts 272 from the ends of the shaft tubes 271.

As is apparent from the preceding specification, the operation of the entire pitch-changing mechanism described therein is both positive and extremely simple in principle, even though a considerable number of parts is necessarily involved. As already explained, a single electric motor 125 furnishes the power required for changing the pitch of both the inboard and outboard propeller blades. Current is supplied to this motor, which is of the reversible type, by means of the insulated cable 346 connected with the brushes 343 and slip rings 334, Figs. 2 and 21, that are joined with the motor terminals by suitable wiring carried by the inboard propeller.

The motor 125 is conveniently located, as best shown in Fig. 3, between the two propellers, and is concentrically mounted with the inboard propeller hub 36, which rotatably supports its hollow armature 126 through the medium of the double-row ball bearing 119; the motor field coils and poles, 130 and 131, being rigidly secured to the same hub 36 through the housing members 106 and 96.

The motor 125 drives the entire pitch-changing mechanism by means of the gear 139 that is rigidly secured to and concentric with the armature 126. This gear meshes with the three symmetrically spaced gears 141, Figs. 3, 4 and 10, which are fastened to the shafts 144. This multiple arrangement of gears 141 and shafts 144 is employed principally for the purpose of producing a balanced torque action on the gears 139 and 198, Figs. 1, 3 and 4, and so as to provide an accurately balanced construction comprising compact, light-weight units.

In Fig. 24, we have shown a simplified circuit diagram for the apparatus hereinbefore described. Current for energizing the motor 125 is obtained from a battery 360 or equivalent, the field windings 130 being energized individually by a governor or switch 361. As shown, the motor conductors extend through the described slip rings 336 and, in each field winding conductor, there is included a limit switch 362 actuated, respectively, by gear segments 363, Fig. 6.

When the motor 125 is not energized, no current flows through the coils 322 of the magnetic brakes 319 and, therefore, the springs 332 press the brake discs 331 against the flanges 143 of the shafts 144; thus holding the latter and the gears 141 against rotation about their respective axes. As a result, the armature 126 is then held at rest with respect to the motor housing 106, which is secured to the inboard propeller hub 36. In other words, when the motor circuit is open, the brakes 319 are spring applied, and this prevents the armature 126 from rotating relatively to the inboard propeller hub 36. On the other hand, when the motor is energized, current also flows through the coils 322 of the magnetic brakes 319, and this creates sufficient magnetic force to draw the brake plate 324 to the right, Fig. 4, against the resistance of the springs 332, thus releasing the braking action of the discs 331 on the flanges 143 of the shafts 144, and so leaving the latter free to be driven by the armature 126.

Each of the shafts 144 is drivably connected with an aligned shaft 153, which is the drive shaft of a planetary speed-reducer unit 149, that operates in the same general manner as similar units well-known in the propeller art and, therefore, requires no further description than has already been given in the preceding specification; it being obvious that the speed of the sun gear 155 is very much greater than that of the final, driven pinion 194 and that the torque delivered to the latter is increased in reverse proportion to the reduction in speed. Each of the three pinions 194 meshes with the large gear 198, Fig. 4, which is driven thereby and which is splined to the bevel gear 207 that meshes with the segments 209 of the several blade gears 72 of the inboard propeller, as best shown in Fig. 2 and the upper right-hand quarter of Fig. 3.

The drive from the motor 125 to the blades 71 of the inboard propeller is thus completed, and it is obvious that when the motor armature 126 rotates in one direction relative to the inboard hub 36, the blades 71 will be rotated in their sockets to change pitch in a given direction, and that the direction of change will be reversed when the direction of rotation of the armature 126 is reversed. It is also apparent that when the armature 126 is held at rest with respect to its housing 106 by the brakes 319, the blades 71 will be held from turning in their sockets despite the action of the centrifugal twisting moments exerted upon them when the propeller is rotating.

In order to simultaneously change the pitch of the blades of the outboard propeller by the power supplied by the single motor 125, and in order to hold said blades against rotation in their sockets through the agency of the brakes 319, the present invention employs differential gearing of the double-planetary type, known in the art as intergearing and generally designated in the accompanying drawings by the reference numeral 211, Figs. 1, 3, 11, 12 and 13. This gearing comprises two sun gears 236 and 248, two ring gears 246 and 247, and two sets of planet gears 243 and 244 carried by a single spider 228. The general arrangement, mounting and intermeshing of these gears have already been explained in detail and are clearly shown in the figures above mentioned. Referring particularly to Fig. 3, it is obvious that because both sets of planets 243 and 244 are carried by a common spider, neither sun gear 236 nor 248 can rotate relatively to the other as long as the ring gears 246 and 247 are held at rest with respect to each other. It is equally obvious that this same condition obtains regardless of the state of rest or motion of the pair of sun gears and the pair of ring gears, that is, regardless of whether all four gears are stationary or whether the sun gears are rotating in either direction at any common speed relatively to the ring gears which may be stationary or also rotating in either direction at any common speed.

Furthermore, it is apparent that regardless of the relative direction and speed of rotation of the sun gears with respect to the ring gears, any relative rotation of one ring gear with respect to the other ring gear will cause a definite proportional rotation of one sun gear with respect to the other sun gear.

Accordingly, relative rotation of the sun gear 248 with respect to the sun gear 236, which is non-rotatably connected with the outboard propeller hub 53, is determined by and is proportionate to the relative rotation of the ring gear 246 with respect to the ring gear 247, which is non-rotatably connected with the inboard propeller hub 36.

Referring to Figs. 3 and 4, it is apparent that rotation of the ring gear 246 is controlled by the integral gear 218 which meshes with the three pinions 216, one of which is pinned to each flexible shaft 212 that is drivably connected with its associated shaft 144. Consequently, when the shafts 144 are held against rotation about their respective axes by the brakes 319, no relative rotation can take place between the sun gears 236 and 248 and, therefore, the latter is held at rest with respect to the outboard propeller hub 53. On the other hand, when the shafts 144 are rotated in a given direction by the motor 125, the sun gear 248 will be caused to rotate in a corresponding direction relatively to the outboard hub, and when the motor is reversed, the sun gear 248 will be caused to rotate in the opposite direction relatively to said hub.

The sun gear 248, therefore, is adapted to drive the pitch-change gearing of the outboard hub and is connected therewith by the integral gear 251 that meshes with three gears 259, each of which is secured to a shaft 254. Each shaft 254 is aligned and flexibly connected with an associated drive shaft 274 of a planetary speed reducer 279, the sun gear 291 of which is integral with the large gear 287 that is driven by the three pinions 286 secured to the shafts 274. As the speed reducer 279 is similar in principle of operation to others well known in the art and has already been described herein, no further description is considered essential. The final, driven gear 303 of the reducer 279 is splined to the bevel gear 308 which meshes with the segments 310 of the several blade gears 92 of the outboard propeller.

The drive from the motor 125 to the blades 88 of the outboard propeller is thus completed, and it is obvious, from what has preceded, that the pitch of said blades is altered in either direction by the motor in unison with the pitch of the blades of the inboard propeller, and that when the motor is deenergized and the brakes 319 are applied, both sets of blades are positively held stationary in their respective sockets. It is also obvious that this coordination of action is accomplished through the novel interconnection of the inboard and outboard pitch-change mechanisms by the double-planetary differential gearing 211.

As shown on the drawings, the gearing is so arranged and the diameters of the gears are so selected that the motor 125, when operating, will change the pitch of the blades of both the inboard and outboard propellers in the same direction and at the same rate. If, however, it is desired to change the pitch of the blades on one propeller at a faster or slower rate than on the other propeller, it is obvious that this may be accomplished, without any change in operating principle, simply by altering the pitch diameter of the three pinions 155 which drive the three inboard speed reducers 149 and by altering in corresponding amount the pitch diameters of the planet gears 157 which mesh with the respective pinions 155. It is also obvious that the same end could be accomplished by changing the diameters of other gears if desired as, for example, the diameters of the three drive pinions 286 of the outboard speed reducer 279 and the diameter of the gear 287 with which said pinions 286 mesh.

Although we have shown a particular arrangement for changing the pitch of the two sets of propeller blades by power obtained from electric motor means and, more specifically, a single electric motor, it shall be understood that the invention is not to be limited to an electric source of power for the purpose stated. Thus, for example, in some of the broader aspects of the invention, the source of pitch-changing power may be non-electric such, for example, as hydraulic.

It will be obvious to those skilled in the art that, although the invention has been shown and described in only its preferred form, various changes and modifications thereof may be made without departing from the spirit or essential attributes thereof, and it is desired, therefore, that only such limitations be placed thereon as are specifically set forth in the appended claims.

What is claimed as new and desired to be secured by Letters Patent is:

1. In a dual rotation propeller having two coaxial tandem contrarotating propeller hubs with a plurality of propeller blades in each hub having their roots rotatable in bearings in the hubs to change the blade pitch, gear means for imparting rotation to the roots of the blades of one of the hubs to rotate said blades about the blade axes, and a power transmitting gear train having the driving gear connected to the blade roots of one hub and the driven gear connected to the blade roots of the other hub, said power transmitting gear train being adapted to rotate the blade roots at the driven end of said gear train through a different pitch angle than the blade roots at the driving end of said gear train.

2. In a dual rotation propeller having two coaxial contrarotating propellers each having blades rotatable therein for pitch change, gear means drivably connected to each set of blades, including an interconnecting gearset between the two propeller hubs, to coordinate pitch change of the blades of one propeller with pitch change of the blades of the other propeller, said gear means having a ratio such that the blades of one propeller change pitch at a different rate than the blades of the other propeller upon driving of said gear means, and a motor drivably connected to said gear means selectively operable to change the pitch of the propeller blades.

3. In a variable pitch dual rotation system comprising a rotating inboard propeller and a coaxial oppositely rotating outboard propeller, a hub for each of said propellers, independent sets of propeller blades journalled in the respective hubs, means for interconnecting the blades of one propeller with the blades of the other propeller to effect simultaneous changes in pitch of the blades of both propellers comprising a planetary speed reducer carried by each hub and an intergearing between and interconnecting said speed reducers for completing the drive connection between speed reducers on the relatively rotatable hubs, and a motor positioned on one of said propellers drivably connected to said interconnecting means.

4. In a variable pitch dual rotation system comprising an inboard propeller and an outboard propeller, a hub for each of said propellers, independent sets of propeller blades journalled in the respective hubs, an electric motor rotatable with one of said propellers, means comprising a planetary speed reduced for drivably connecting said electric motor to the blades of said inboard propeller, means comprising a planetary speed reducer for drivably connecting said electric motor to the blades of said outboard propeller, and means for energizing said electric motor to thereby change the pitch of said inboard and outboard propeller blades and a planetary intergearing between said hubs in one of said drivably connecting means leading to the other of said propellers.

5. In a variable pitch dual rotation system comprising a rotating inboard propeller and a coaxial oppositely rotating outboard propeller, a hub for each of said propellers, independent sets of propeller blades journalled in the respective hubs, means for interconnecting the blades of one propeller with the blades of the other propeller to effect simultaneous changes in pitch of the blades of both propellers comprising a hub-coaxial planetary speed reducer carried by said outboard hub and hub-eccentric planetary speed reducers carried by said inboard hub, an intergearing between said eccentric reducers and said coaxial reducer, and an annular motor positioned between and on one of said propellers drivably connected to said interconnecting means between said eccentric and coaxial reducers.

6. In a variable pitch dual rotation system comprising a rotating inboard propeller and a coaxial oppositely rotating outboard propeller, a hub for each of said propellers, independent sets of propeller blades journalled in the respective hubs, means for interconnecting the blades of one propeller with the blades of the other propeller to effect simultaneously changes in pitch of the blades of both propellers comprising a hub-coaxial planetary speed reducer on the outboard hub, and hub-eccentric planetary speed reducers on the inboard hub arranged in balanced relation between the blades thereof, and an annular motor positioned on one of said hubs drivably connected to said interconnecting means between said coaxial and eccentric reducers.

7. In a dual rotation propeller system including coaxial oppositely rotating propeller hubs each having blades rotatable for pitch change, a motor carried by one hub, gearing connecting said motor with the blades of the one hub for effecting pitch changes in response to motor operation, a transfer gearset carried by said one hub, driven by said motor simultaneously with said first gearing and having an output member rotatable with the other hub and rotatable relative to the other hub to impart pitch change motion to the blades of the other hub, and a second set of gearing connecting said output member with the blades of said other hub.

8. In a dual rotation propeller system including coaxial oppositely rotating propeller hubs each having blades rotatable for pitch change, a motor carried by one hub having a driving element connected with the blades of said one hub for imparting pitch changing movement thereto, a differential gearset carried by said one hub driven by said motor, said gearset having a reaction member, means drivably connecting said reaction member with the other hub for rotation therewith, an output member driven and carried by said gearset but rotatable with said reaction member and other hub, and means connecting said output member with the blades of said other hub for imparting pitch changing movement thereto.

9. In a dual rotation propeller system including tandem coaxial oppositely rotating propeller hubs each having blades rotatable for pitch change, a pitch changing motor carried by one hub, separate driving connections from said motor to the blades in each propeller hub, one of said driving connections between the motor carrying hub and the other hub comprising interconnecting gearing to transmit pitch changing motion from the motor to said other hub, said latter driving connection including an elastic drive coupling to allow misalignment of said hubs from their normal coaxial state without disrupting the pitch change driving connection.

10. In a variable pitch dual rotation system comprising an inboard propeller and an outboard propeller, a hub for each of said propellers, independent sets of propeller blades journalled in the respective hubs, a motor rotatable with the inboard propeller hub, a gear system drivably inter-connecting said motor and the blades of said inboard propeller hub, a separate gear system comprising a flexible shaft drivably connecting said motor to the blades of said outboard propeller, and means for energizing said motor to thereby change the pitch of said inboard and outboard propeller blades.

11. In a dual rotation propeller system including coaxial oppositely rotating propeller hubs each having blades rotatable for pitch change, a motor carried by one hub having a driving element connected with the blades of said one hub for imparting pitch changing movement thereto, a differential gearset carried by said one hub driven by said motor, said gearset having a reaction member, means drivably connecting said reaction member with the other hub for rotation therewith, an output member driven and carried by said gearset but rotatable with said reaction member and other hub, and means connecting said output member with the blades of said other hub for imparting pitch changing movement thereto, said last named connecting means being resilient, and the driving connection between said other hub and said reaction member being resilient, so that, upon relative lateral displacement of the axes of the two hubs in operation, the pitch change driving connection between hubs will retain its effectiveness.

12. In a variable pitch dual rotation system comprising a rotating inboard propeller and a coaxial oppositely rotating outboard propeller, a hub for each of said propellers, independent sets of propeller blades journalled in the respective hubs, means for interconnecting the blades of one propeller with the blades of the other propeller to effect simultaneous changes in pitch of the blades of both propellers comprising a planetary speed reducer carried by each hub and an intergearing between and interconnecting said speed reducers for completing the drive connection between speed reducers on the relatively rotatable hubs, a motor positioned on one of said propellers drivably connected to said interconnecting means, and a brake carried by one of said hubs and acting upon said interconnecting means between said speed reducers.

13. In a variable pitch propeller, a hub, blades swivelled in said hub, a master gear concentric with said hub, means actuated by said gear to alter the pitch of said blades, an annular motor arranged coaxially around said hub, and a hub-eccentric planetary speed reducer mounted on said hub and arranged on an axis substantially parallel with the hub axis and interconnected between said motor and master gear.

GEORGE W. BRADY.
CHARLES W. CHILLSON.

REFERENCES CITED

The following references are of record in the file of this patent:

UNITED STATES PATENTS

| Number | Name | Date |
|---|---|---|
| 2,124,078 | Palmer | July 19, 1938 |
| 2,228,776 | Mullin | Jan. 14, 1941 |
| 2,291,953 | Dicks | Aug. 4, 1942 |
| 2,293,912 | Mullin | Aug. 25, 1942 |
| 2,338,420 | Freitag | Jan. 4, 1944 |
| 2,362,444 | Blanchard et al. | Nov. 14, 1944 |
| 2,367,230 | McCoy | Jan. 16, 1945 |
| 2,389,161 | McCoy | Nov. 20, 1945 |

FOREIGN PATENTS

| Number | Country | Date |
|---|---|---|
| 50,162 | France (Addition to 844,832) | Jan. 17, 1940 |
| 350,706 | Italy | July 20, 1937 |
| 483,760 | Great Britain | Apr. 26, 1938 |
| 819,581 | France | Oct. 21, 1937 |